United States Patent
Peterson et al.

(10) Patent No.: US 11,740,391 B1
(45) Date of Patent: Aug. 29, 2023

(54) FLUID LENS OPERATIONAL FEEDBACK USING SENSOR SIGNAL

(71) Applicant: META PLATFORMS TECHNOLOGIES, LLC, Menlo Park, CA (US)

(72) Inventors: Jonathan Robert Peterson, Woodinville, WA (US); Kenneth Alexander Diest, Kirkland, WA (US); Renate Eva Klementine Landig, Seattle, WA (US); Liliana Ruiz Diaz, Redmond, WA (US); Robin Sharma, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 326 days.

(21) Appl. No.: 17/139,273

(22) Filed: Dec. 31, 2020

(51) Int. Cl.
  *G02B 3/14* (2006.01)
  *G02B 26/00* (2006.01)

(52) U.S. Cl.
  CPC .............. *G02B 3/14* (2013.01); *G02B 26/004* (2013.01)

(58) Field of Classification Search
  CPC ................................ G02B 3/14; G02B 26/004
  See application file for complete search history.

(56) References Cited

U.S. PATENT DOCUMENTS

| | | | |
|---|---|---|---|
| 5,138,494 A | 8/1992 | Kurtin | |
| 5,371,629 A | 12/1994 | Kurtin et al. | |
| 5,668,620 A | 9/1997 | Kurtin et al. | |
| 5,696,521 A | 12/1997 | Robinson et al. | |
| 5,956,183 A | 9/1999 | Epstein et al. | |
| 5,999,328 A | 12/1999 | Kurtin et al. | |
| 7,256,943 B1 | 8/2007 | Kobrin et al. | |
| 8,254,034 B1 | 8/2012 | Shields et al. | |
| 10,634,824 B1 | 4/2020 | Ouderkirk et al. | |
| 10,962,844 B1 | 3/2021 | Smyth et al. | |
| 11,073,697 B1 | 7/2021 | Robin et al. | |
| 2003/0095336 A1 | 5/2003 | Floyd | |

(Continued)

FOREIGN PATENT DOCUMENTS

| | | |
|---|---|---|
| WO | 2013143630 A1 | 10/2013 |
| WO | 2018158347 A1 | 9/2018 |
| WO | 2019186181 A1 | 10/2019 |

OTHER PUBLICATIONS

Kaur P., et al., "An Introduction to Capacitive Sensing, Part 1," EDN, 2012, 8 Pages, Retrieved from the internet: URL: https://www.edn.com/an-introduction-to-capacitive-sensing-part-1/.

(Continued)

*Primary Examiner* — Joseph P Martinez
(74) *Attorney, Agent, or Firm* — Greenberg Traurig, LLP

(57) ABSTRACT

Disclosed devices may include a membrane having a membrane curvature, a substrate, an enclosure (defined at least in part by the membrane and the substrate) enclosing a fluid, a peripheral structure configured to adjust the membrane curvature, and a sensor configured to provide a sensor signal that is a function of the membrane curvature. The device may also include a controller configured to control the membrane curvature using a control signal. For example, the control signal may be provided to at least one actuator. The controller may receive a sensor signal from the sensor and modify the control signal based on the sensor signal. Examples also include associated methods and systems.

17 Claims, 18 Drawing Sheets

Adjustable Lens

(56) References Cited

U.S. PATENT DOCUMENTS

| | | |
|---|---|---|
| 2004/0156983 A1 | 8/2004 | Moravec et al. |
| 2006/0077562 A1 | 4/2006 | Silver |
| 2006/0163612 A1 | 7/2006 | Kouvetakis et al. |
| 2007/0279585 A1 | 12/2007 | Bartoli |
| 2008/0001169 A1 | 1/2008 | Lochtefeld |
| 2008/0207846 A1 | 8/2008 | Henze et al. |
| 2008/0231604 A1 | 9/2008 | Peterson |
| 2008/0239503 A1 | 10/2008 | Conradi et al. |
| 2008/0257409 A1 | 10/2008 | Li et al. |
| 2009/0147371 A1 | 6/2009 | Lee et al. |
| 2010/0068866 A1 | 3/2010 | Yu et al. |
| 2010/0118413 A1 | 5/2010 | Kim et al. |
| 2010/0176375 A1 | 7/2010 | Lochtefeld |
| 2010/0182703 A1 | 7/2010 | Bolis |
| 2010/0252861 A1 | 10/2010 | Lochtefeld |
| 2011/0085131 A1 | 4/2011 | Gupta et al. |
| 2011/0085243 A1 | 4/2011 | Gupta et al. |
| 2012/0041553 A1 | 2/2012 | Gupta et al. |
| 2012/0287512 A1 | 11/2012 | Egan et al. |
| 2013/0225072 A1 | 8/2013 | Fuller et al. |
| 2014/0077220 A1 | 3/2014 | Kryliouk et al. |
| 2014/0253873 A1 | 9/2014 | Crosby et al. |
| 2014/0261611 A1 | 9/2014 | King et al. |
| 2014/0313159 A1 | 10/2014 | Wilson et al. |
| 2015/0055084 A1 | 2/2015 | Stevens et al. |
| 2015/0116656 A1 | 4/2015 | Stevens et al. |
| 2015/0185480 A1 | 7/2015 | Ouderkirk et al. |
| 2016/0049299 A1 | 2/2016 | Ko et al. |
| 2016/0223837 A1 | 8/2016 | Holland et al. |
| 2017/0269378 A1 | 9/2017 | Stevens et al. |
| 2019/0097080 A1 | 3/2019 | Ide |
| 2019/0258084 A1 | 8/2019 | Stevens et al. |
| 2019/0302479 A1 | 10/2019 | Smyth et al. |
| 2020/0185590 A1 | 6/2020 | Malhotra et al. |
| 2020/0259307 A1 | 8/2020 | Sharma et al. |
| 2020/0355929 A1 | 11/2020 | Zhang et al. |
| 2020/0379561 A1 | 12/2020 | Sharma et al. |
| 2020/0387014 A1 | 12/2020 | Smyth et al. |
| 2021/0405373 A1* | 12/2021 | Stevens .............. G02B 27/0172 |

OTHER PUBLICATIONS

Li N., et al., "High Sensitive Capacitive Sensing Method for Thickness Detection of the Water Film on an Insulation Surface," IEEE Access, 2019, vol. 7, pp. 96384-96391.

Pickering P., "Capacitive Sensors: An Attractive Option for Contactless Sensing," ElectronicDesign, Apr. 2016, 8 Pages.

Wikipedia: "Capacitive Sensing," Oct. 17, 2021, Retrieved from the internet: URL: https://en.wikipedia.org/wiki/Capacitive_sensing, 5 Pages.

\* cited by examiner

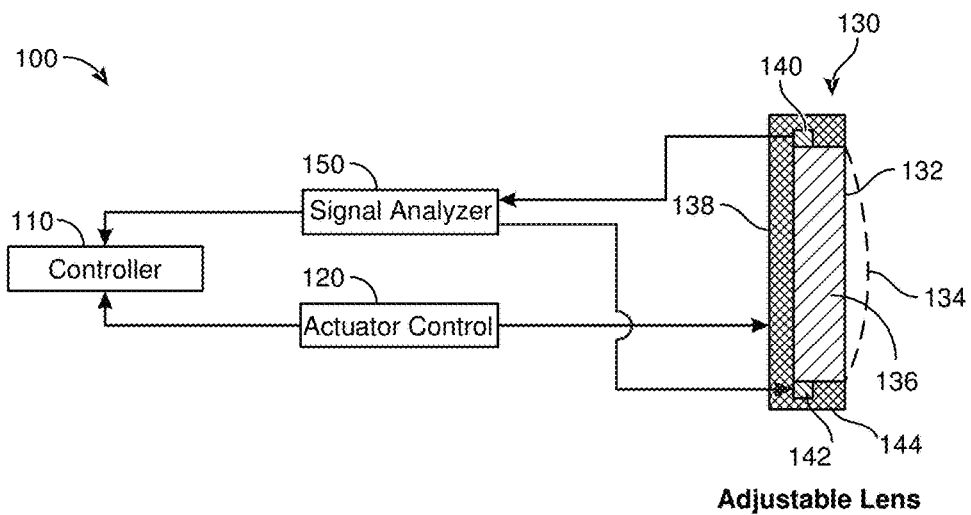
FIG. 1
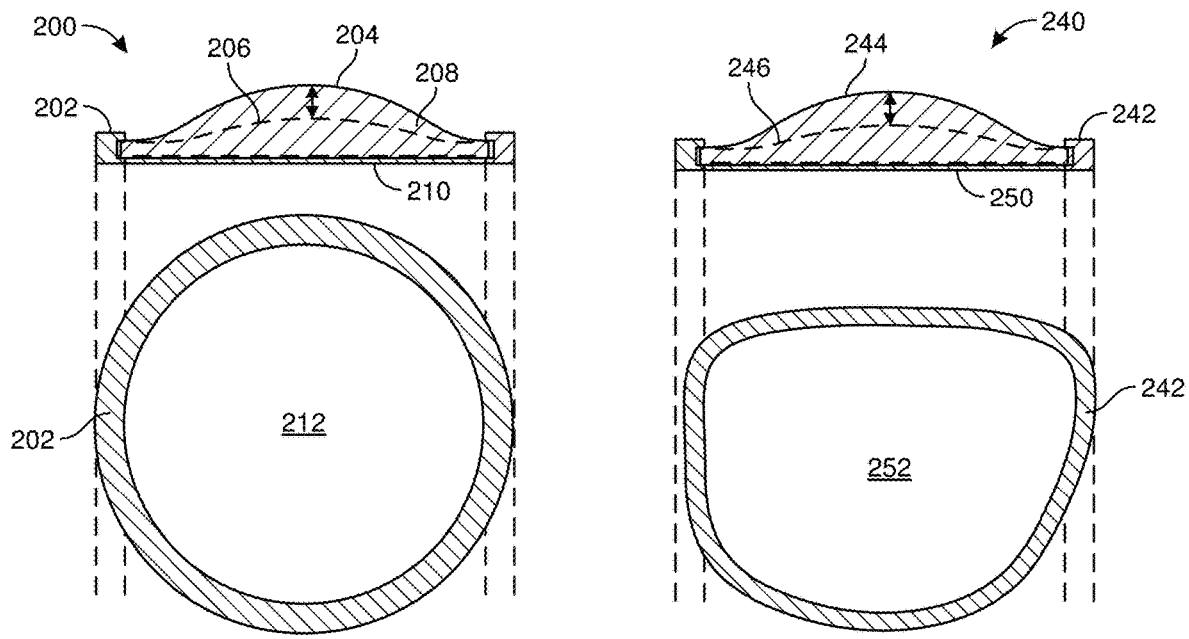
FIG. 2A  FIG. 2B

Example E-Field Visulaization

FLUID LENS OPERATIONAL FEEDBACK USING SENSOR SIGNAL

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 shows a simplified schematic showing a fluid lens including a signal analyzer, according to some embodiments.

FIGS. 2A and 2B show example fluid lenses having circular and non-circular peripheries, according to some embodiments.

Figure 3:
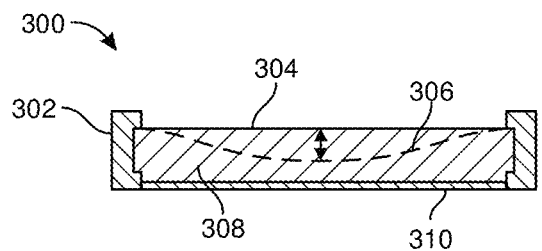
FIG. 3 shows an example fluid lenses that may be actuated into a plano-concave configuration, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

At a high level, the present disclosure is generally directed to fluid lenses and improved methods of adjusting a fluid lens. An example device, such as a fluid lens, may include an adjustable element such as a membrane. In some examples, one or more optical properties of the fluid lens may be adjusted by modifying the conformation of the membrane. For example, an optical power of the lens may be adjusted by modifying the curvature of the membrane.

The present disclosure is also generally directed to devices, such as transducers, actuators, and/or sensors. As is explained in greater detail below, embodiments of the present disclosure may include a device, such as an actuator and/or touch sensor, including a capacitance sensor. Example devices may include an electrostatic or piezoelectric haptic actuator. A capacitance sensor may be integrated with the device to provide real-time feedback and allow dynamic control of the device. In some examples, real-time feedback may include an adjustment (or starting an adjustment) of the optical power of a fluid lens within 10 seconds of obtaining a sensor signal.

An example device may include a membrane, a first electrode supported by the membrane, a second electrode, a sensor configured to provide a sensor signal (e.g., a capacitance measurement between the first electrode and the second electrode), and a controller configured to provide a control signal to the device. The control signal may include an electrical potential applied between electrodes (e.g., to control an electroactive element) or a control signal provided to one or more actuators. The controller may be configured to modify the control signal based on the sensor signal, such as a sensor signal based on a light sensor and/or a capacitance sensor. Example devices may include one or more flexible membranes that may, at least in part, define an enclosure that is at least partially filled with a lens fluid. Examples also include associated methods (e.g., of adjusting the optical power of a fluid lens) and systems (e.g., systems including one or more fluid lenses).

Figure 7:
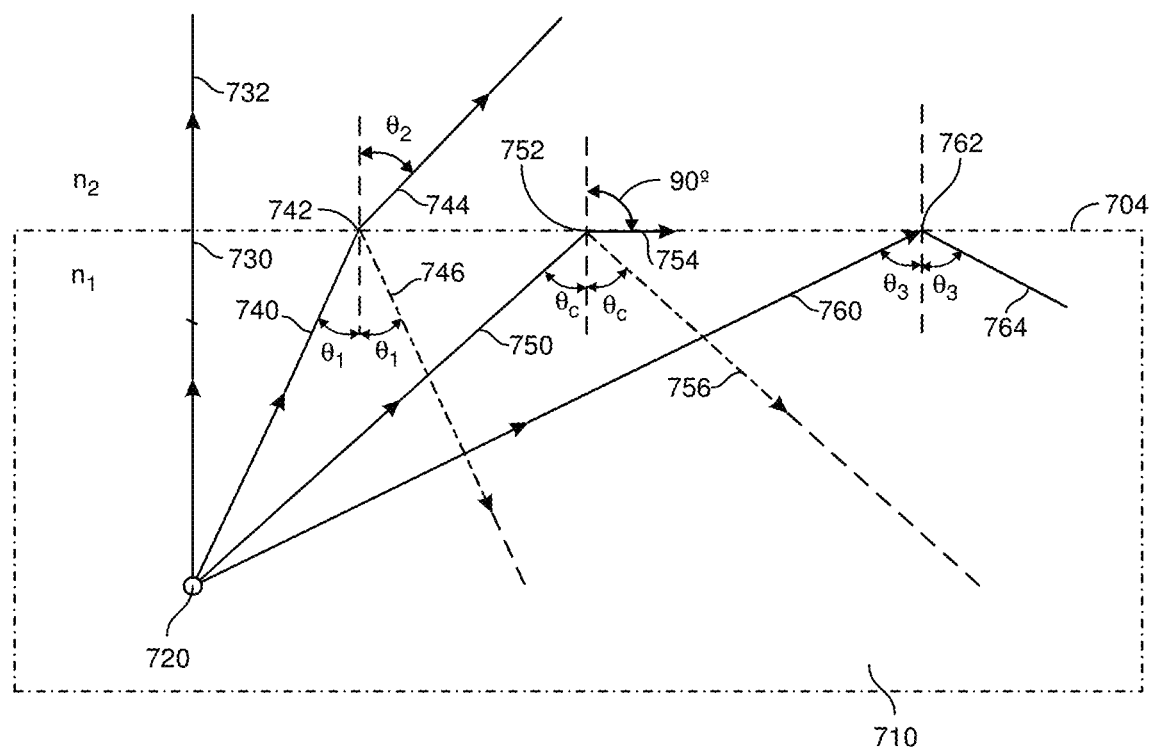
FIG. 7 illustrates total internal reflection and partial reflection from an interface.
Figure 8:
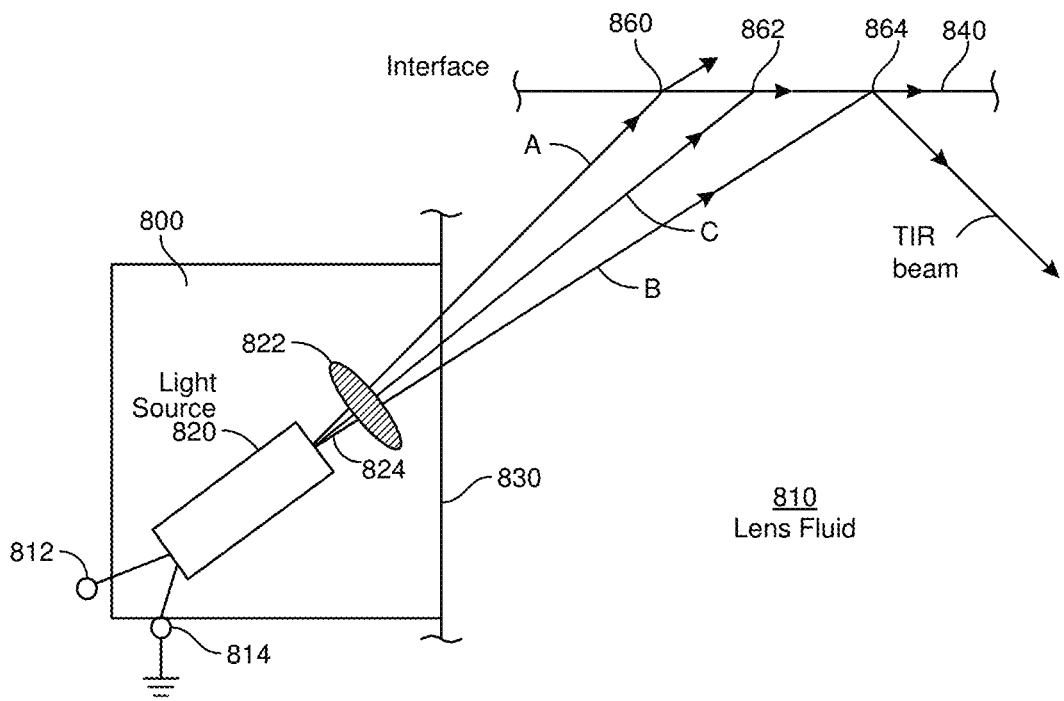
FIG. 8 illustrate total internal reflection of a portion of emitted beams from a light source, according to some embodiments.
Figure 9:
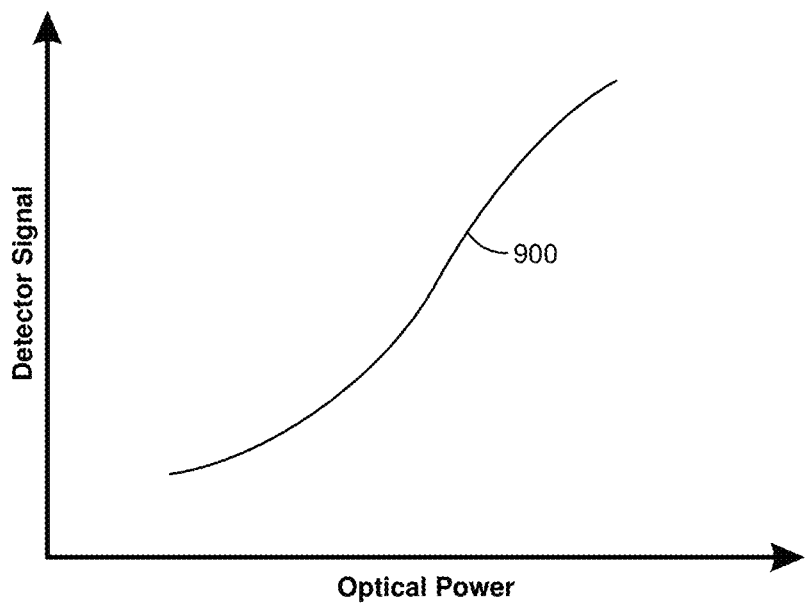
FIG. 9 shows a possible relationship between sensor signal and optical power for a fluid lens, according to some embodiments.
Figure 19:
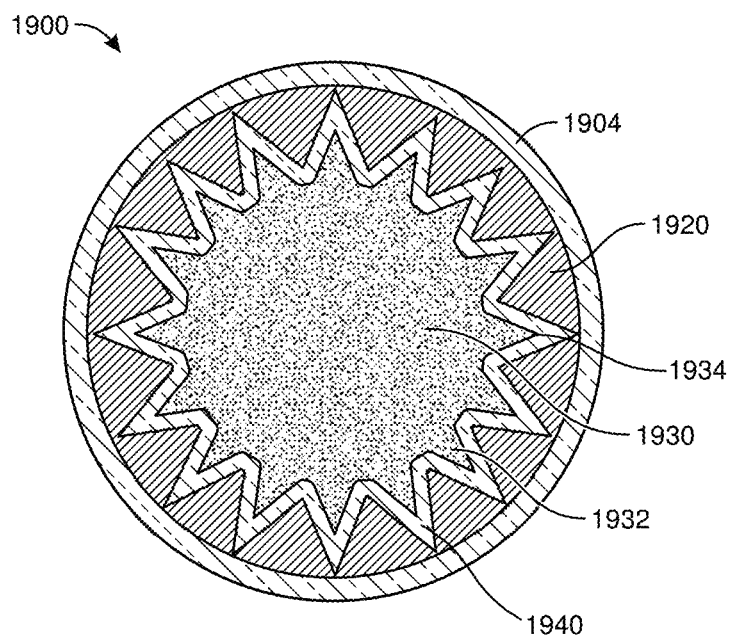
FIG. 19 illustrates a polygonal electrode configuration, which may be used on the substrate and/or membrane, according to some embodiments.
Figure 20:
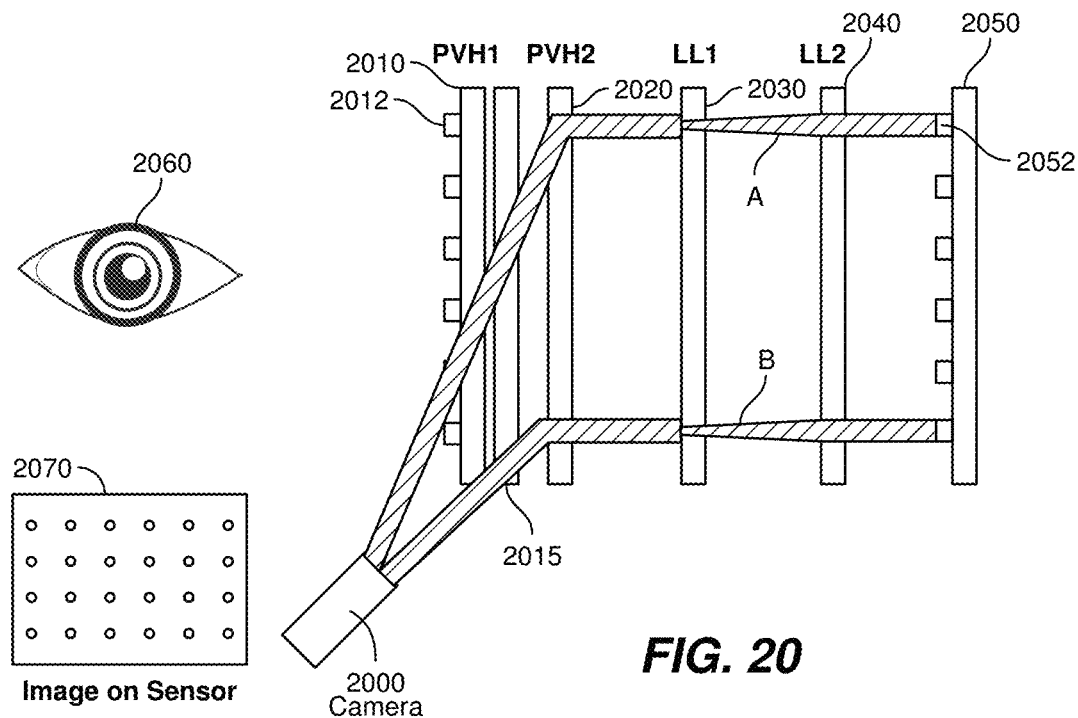
FIG. 20 illustrates lens power monitoring using a sensor, which may be combined with other approaches described herein.
Figure 21:
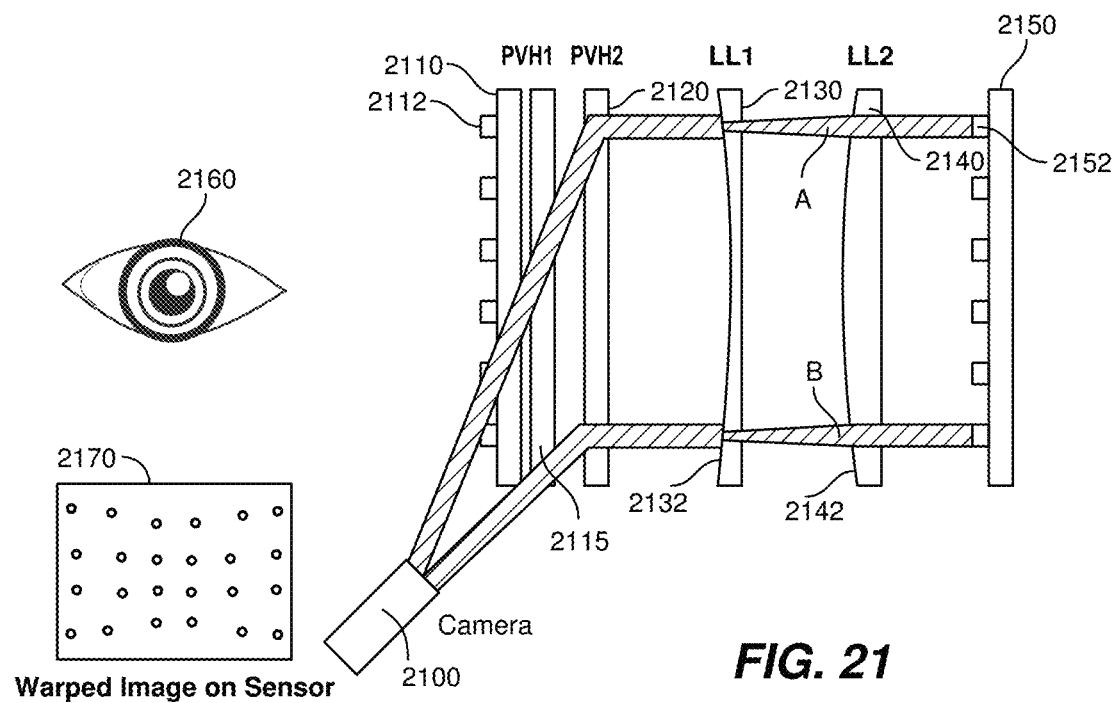
FIG. 21 further illustrates lens power monitoring using a sensor, according to some embodiments.
Figure 22:
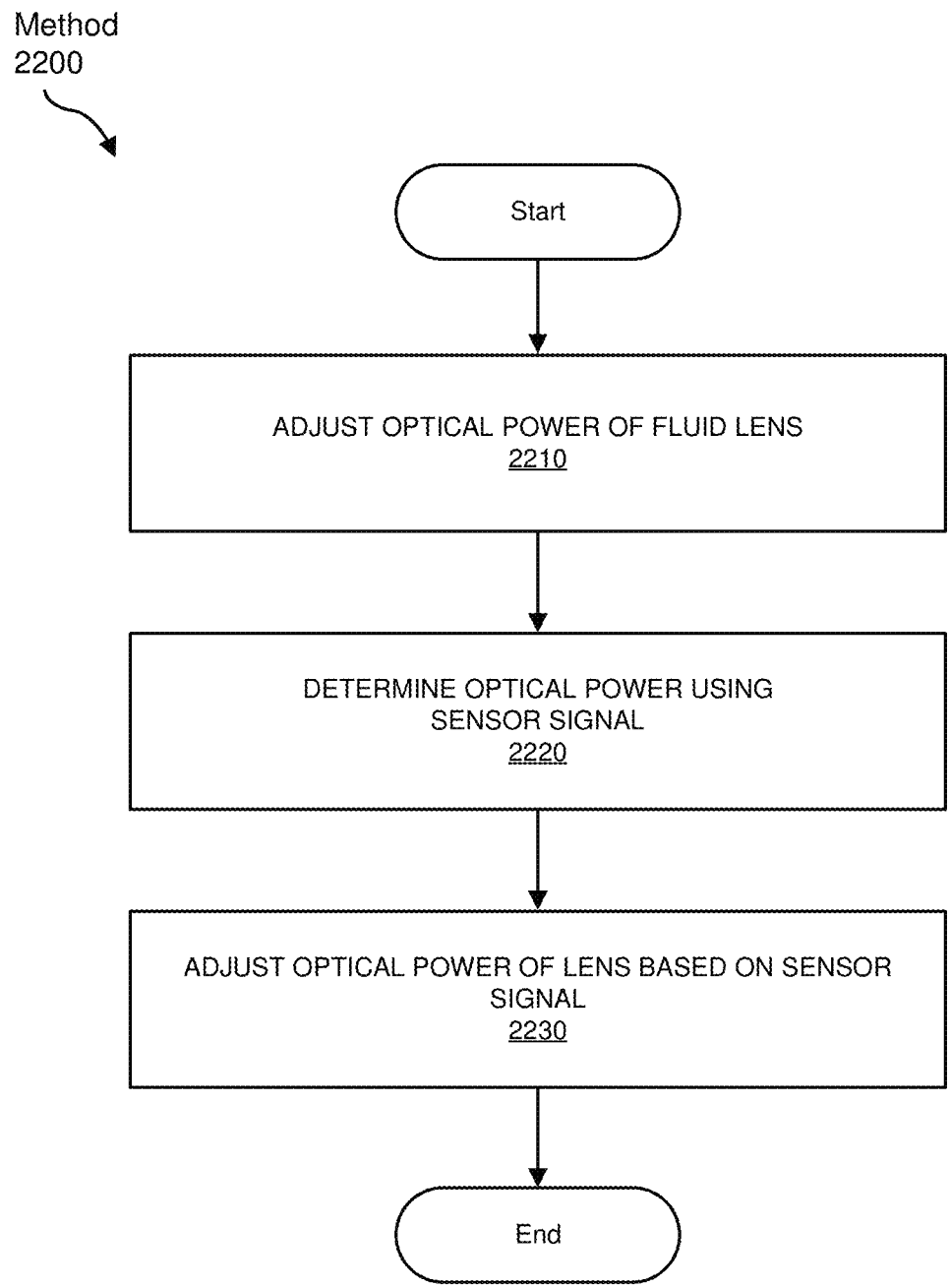
FIG. 22 illustrates an example sensor-based method that may be used to adjust the control of a fluid lens, according to some embodiments.
Figure 23:
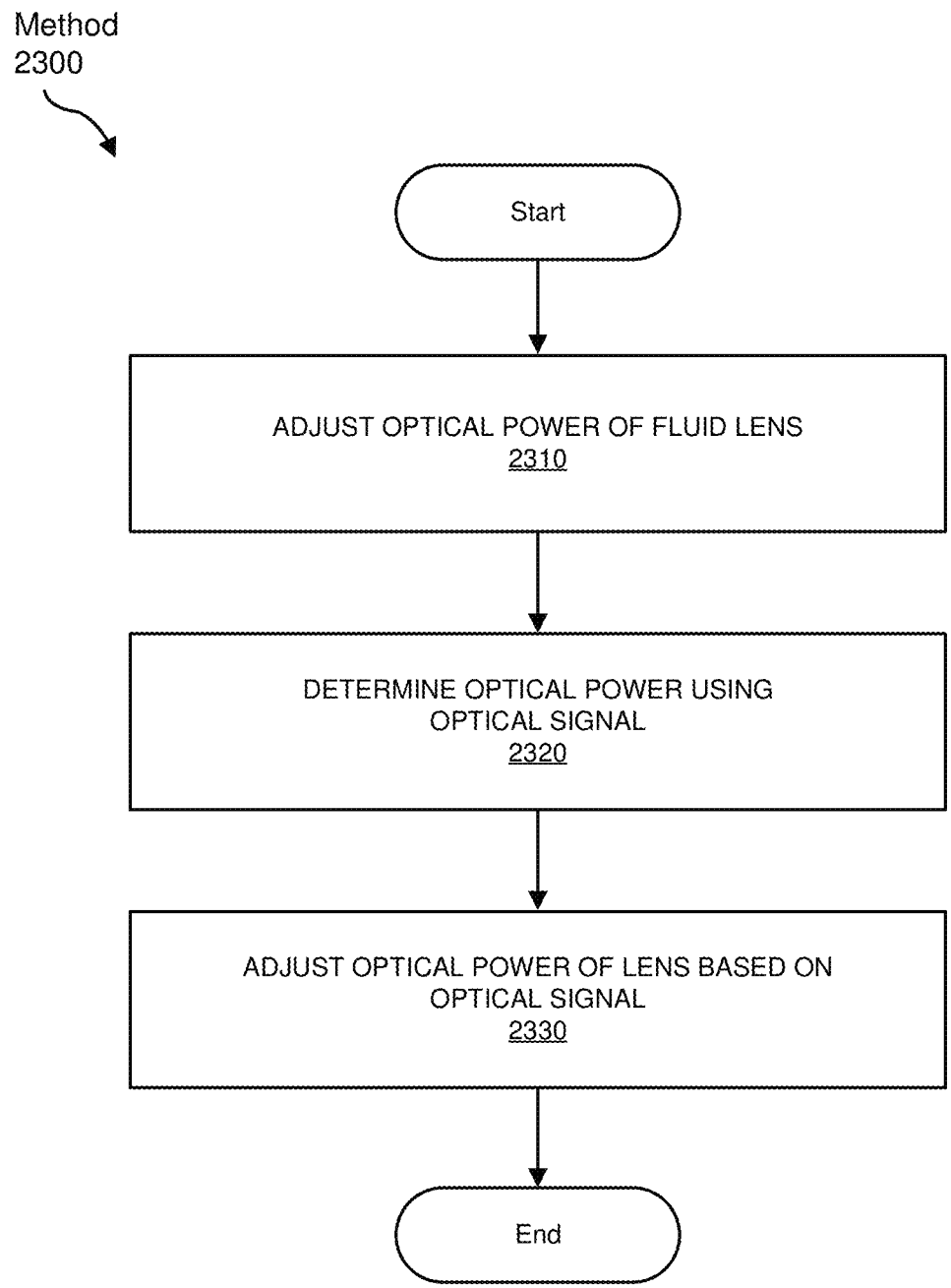
FIG. 23 illustrates an example optics-based method that may be used to determine an optical power of a fluid lens, according to some embodiments.
Figure 24:
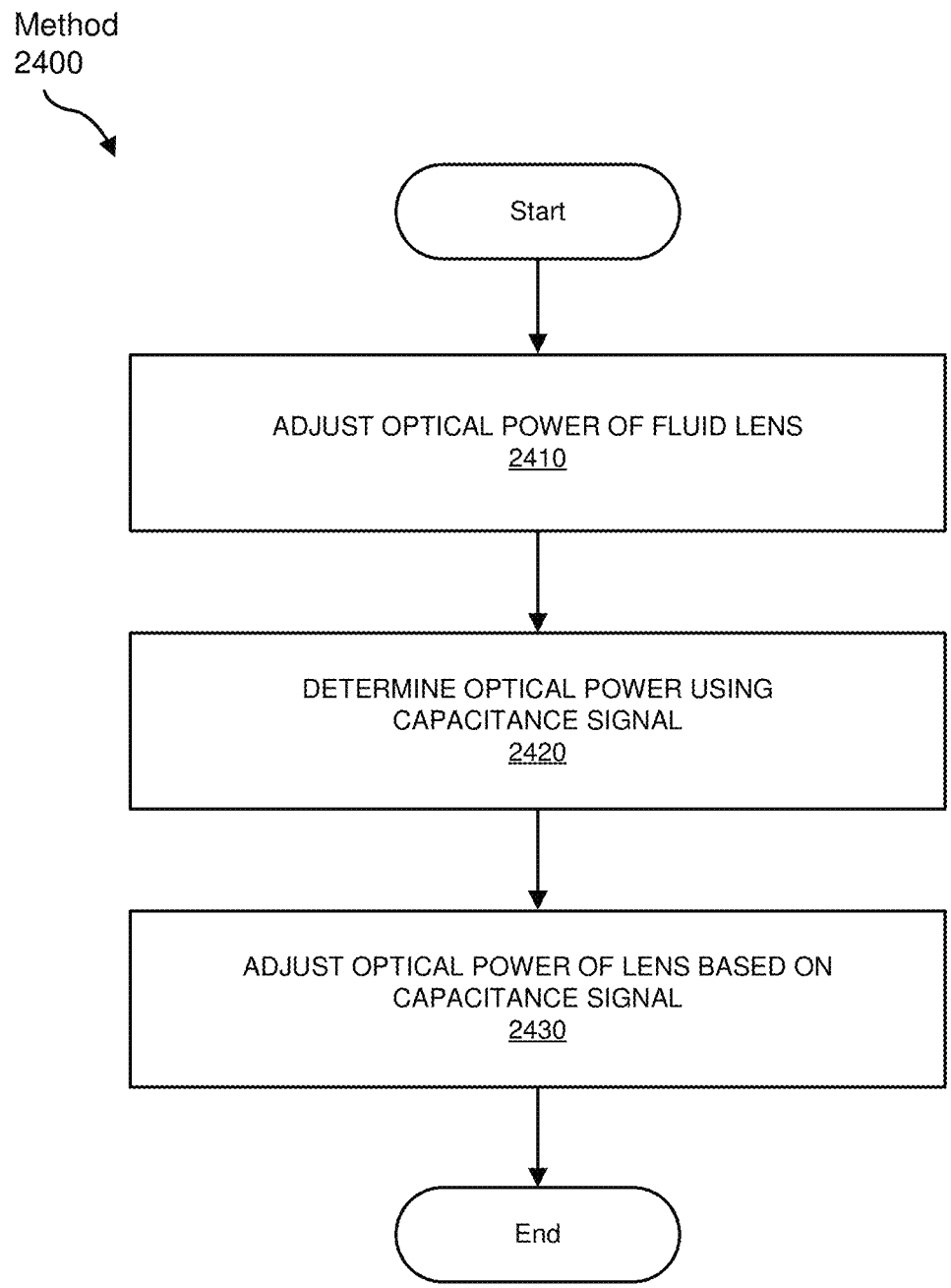
FIG. 24 illustrates an example capacitance-based method that may be used to determine an optical power of a fluid lens, according to some embodiments.
Figure 25:
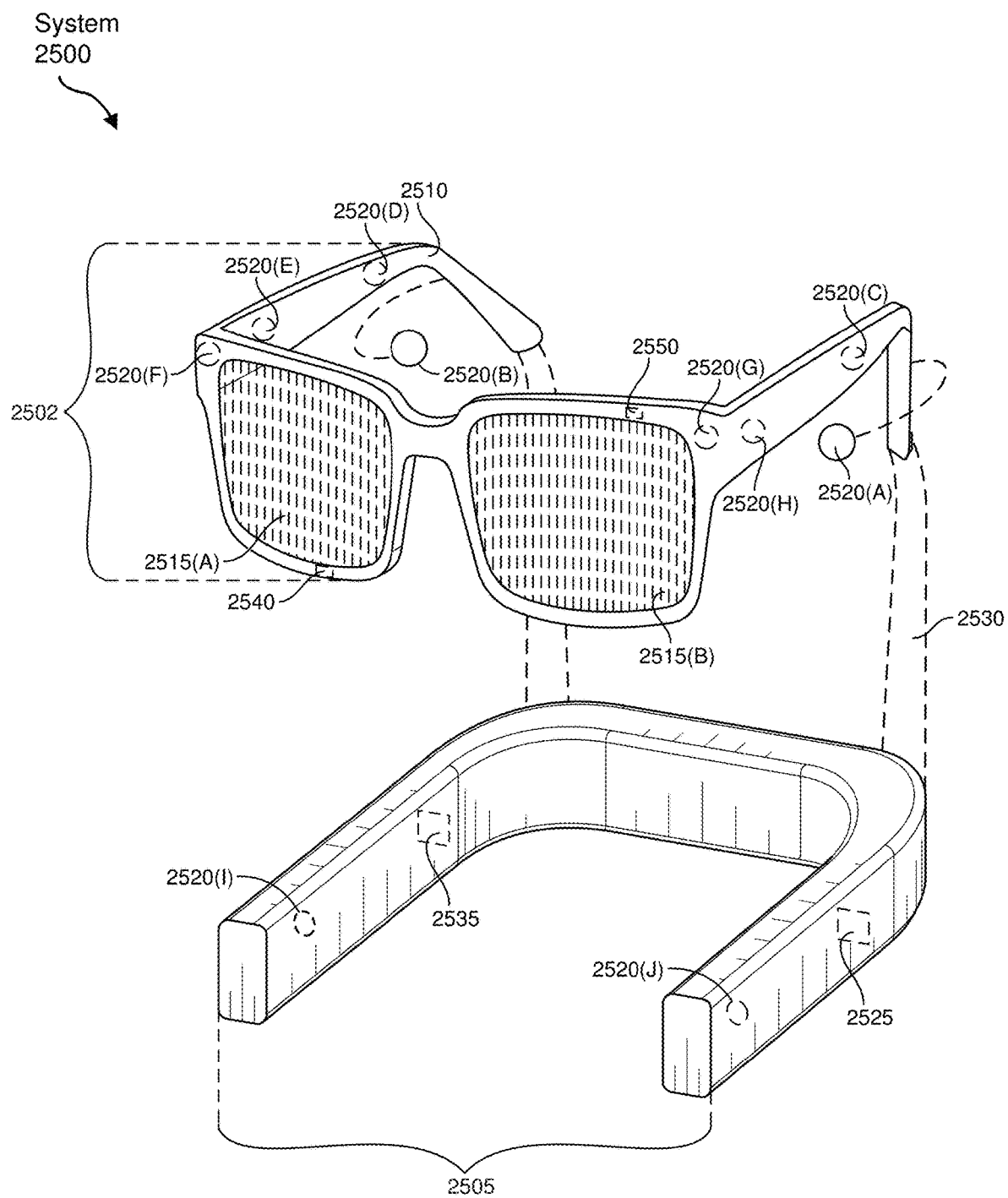
FIG. 25 is an illustration of exemplary augmented-reality glasses that may be used in connection with embodiments of this disclosure.
Figure 26:
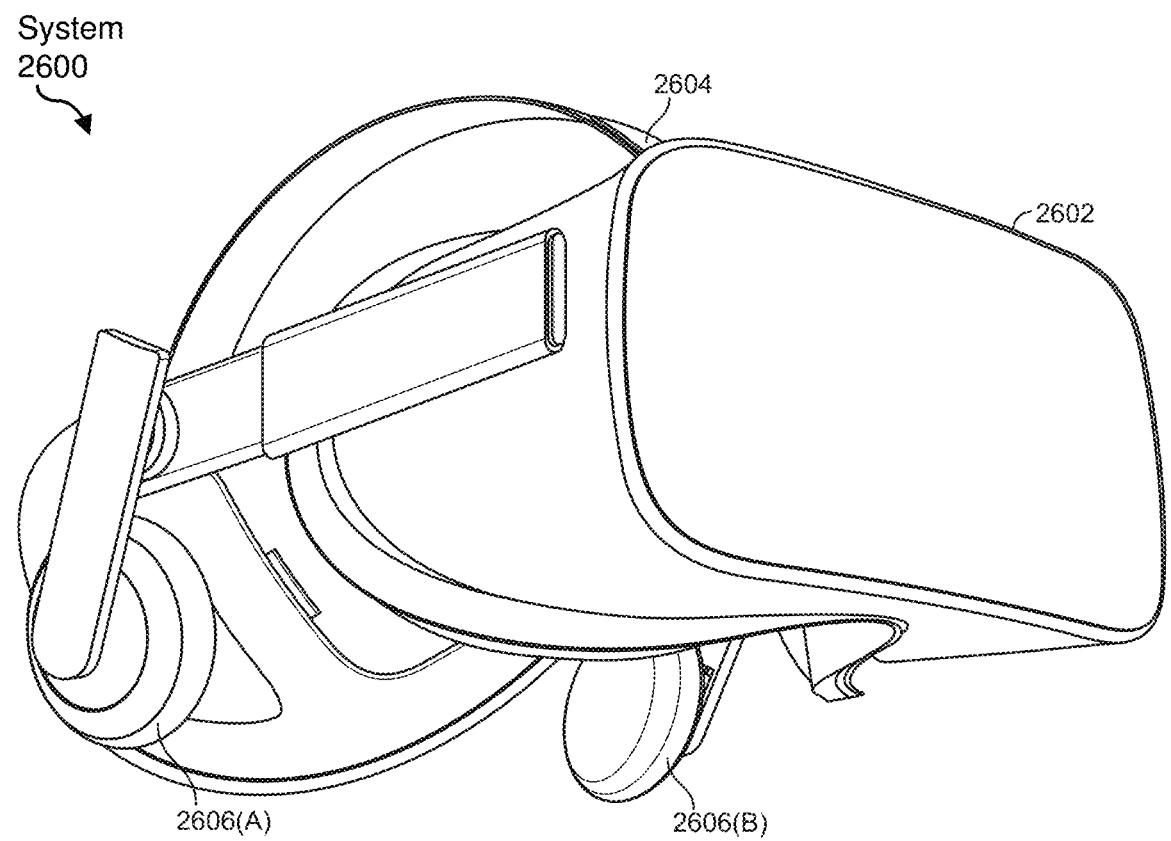
FIG. 26 is an illustration of an exemplary virtual-reality headset that may be used in connection with embodiments of this disclosure.

The following provides, with reference to FIGS. 1-26, a detailed description of actuator configurations and associated methods and applications. FIG. 1 shows a simplified schematic of a fluid lens including a signal analyzer. FIGS. 2A-6B show example fluid lens configurations. FIGS. 7-8 illustrate total internal reflection and partial reflection from an interior interface of a fluid lens. FIG. 9 shows a possible relationship between an example sensor signal and the optical power of a fluid lens. FIGS. 10A-17 illustrate example fluid lenses including substrate-supported electrodes that allow a sensor signal to be generated based on capacitance measurements. FIGS. 18-19 illustrate a membrane-based electrode configuration. FIGS. 20-21 illustrate lens power monitoring using an image sensor, which may be combined with (or used to calibrate) one or more other approaches, such as the use of an optical or capacitance-based sensor signal. FIGS. 22-24 illustrates example methods that may be used to control the optical power of a fluid lens. FIGS. 25-26 illustrate exemplary augmented-reality environments that may be used in connection with embodiments of this disclosure.

In some examples, a fluid lens may include a flexible membrane, a substrate, a lens adjustment mechanism, and a sensor configured to determine one or more of an optical or electrical parameter from which an optical parameter of the lens may be determined. In some examples, the substrate may be replaced by a second membrane. The one or more membranes of the fluid lens may at least partially define an enclosure that may include a lens fluid. In some examples, the enclosure may be defined, at least in part, by a substrate, a membrane, and an optional edge seal. The lens fluid may be a high-index liquid, as discussed in more detail below.

In some examples, a lens (such as a fluid lens) may include a light source and a light sensor, and the light sensor signal may vary based on the optical power of the lens. For example, as the curvature of the membrane is adjusted, the amount of light totally internally reflected within the lens may vary. The sensor signal may vary based on the amount of light totally internally reflected within the lens, and the optical power of the lens may be determined from the sensor signal. In some examples, the lens may include electrodes, and the capacitance between the electrodes may vary as a function of the optical power of the lens. A sensor signal, such as a light sensor signal or a capacitance sensor signal, may be used to modify the control of the fluid lens. For example, the lens power may be adjusted (e.g., by a controlled) based on the sensor signal.

In some examples, a lens may include a membrane supporting at least one flexible electrode. A second electrode may be located on the membrane or on a substrate or second membrane. In some examples, the capacitance between the electrodes may be a function of an optical property of the lens, such as optical power.

In some examples, a sensor signal may be determined in conjunction with a known control signal (e.g., a lens actuation signal) used to control the lens. The sensor signal may be used as a feedback signal used to modify the lens actuation. For example, a device may include a controller configured to provide the control signal, receive the sensor signal, and modify the control signal based on the sensor signal. For example, the controller may use a lookup table to correlate the desired optical power with a control signal (e.g., a lens actuation signal). The lookup table may be modified based on the sensor signal if the sensor signal indicates that the desired optical power was not achieved. In some examples, the sensor signal may be used to calibrate the device or to allow compensation for the effects of ambient conditions (e.g., temperature) and/or aging effects (e.g., variations in membrane elasticity) on the optical properties of the lens.

In some examples, a device (e.g., an adjustable lens) may include one or more light sources and/or one or more light sensors. In some examples, a device may include one or more pairs of light sources and light sensors, where each light source may provide a light beam that may be detected by a corresponding light sensor. In some examples, light from a light source may be detected by one or more light sensors. For example, a single light source (or associated optical element) may provide one or more light beams. In some examples, a light sensor may detect light beams from one or more light sources. Light sources may be operated at intervals (e.g., pulsed). In some examples, phase sensitive detection or time-gating may be used, for example, to reduce noise or allow a sensor to provide sensor signals based on light beams received from one or more light sources. A signal analyzer, such as discussed above in relation to FIG. 1, may be used for signal processing, phase-sensitive detection, time-gating, noise reduction, or other suitable aspect of signal processing. In some examples, a light sensor signal may be responsive to optical power. In some examples, a light sensor signal may allow determination of one or more lens parameters, such as optical power, cylindricity, astigmatism correction, membrane curvature, other lens parameter, or combination thereof. In some examples, a calibration light detector may be located substantially adjacent the light source, or may be integrated with the light source, and may allow correction for variations in light source emission power (e.g., age-related, temperature-related, or other variations), or variations in lens fluid absorption. In some examples, a ratio may be formed between two or more light sensor signals, for example, to provide a ratiometric light sensor signal that may allow substantial elimination of the effect of common mode factors such as temperature or. In some examples, a system calibration may be performed with the lens in a known configuration, such as a configuration in which the membrane is generally planar.

Features from any of the embodiments described herein may be used in combination with one another in accordance with the general principles described herein. These and other embodiments, features, and advantages are more fully understood upon reading the detailed description in conjunction with the accompanying drawings and claims.

FIG. 1 shows a simplified schematic showing a fluid lens including a signal analyzer, according to some embodiments. The device 100 includes controller 110, actuator control 120, and adjustable lens 130, which in this example includes membrane 132, lens fluid 136, substrate 138, light sensor 140, light source 142, membrane 132, peripheral structure 144, and signal analyzer 150. The membrane profile is adjustable, and is shown in a generally planar configuration at 132 (low or zero optical power). The dashed line 134 shows a possible higher optical power configuration of the membrane.

The membrane may be adjusted by any suitable method. For example, the periphery of the membrane may be displaced towards the substrate 138 so that the central portion of the membrane may be displaced away from the substrate. The peripheral structure may include one or more actuators and/or one or more support structures that may guide the path of the periphery of the membrane. The volume of lens fluid may be conserved within the lens adjustments. In some examples, a lens adjustment may displace lens fluid from the periphery towards the center of the lens. In some examples, the membrane may include an electroactive material and the membrane may include electrodes configured to constrict the membrane. These and other aspects are discussed further below.

The signal analyzer 150 may received a sensor signal from light sensor 140, which may be a light sensor. The controller, optionally through the signal analyzer, may also control the light source 142. In some examples, the controller may energize the light source directly or using additional circuitry. The controller 110 may use actuator control 120 to adjust the optical power of the lens, for example, using one or more actuators (not shown), that may be included in the peripheral structure 144. The optical power of the lens may be adjusted using a control signal provided by the controller 110, and this may be adjusted based on the sensor signal provided by the light sensor 140. In some examples, the signal analyzer may be omitted and the light sensor may provide a sensor signal directly to the controller.

FIGS. 2A and 2B show example fluid lenses having circular and non-circular peripheries. FIG. 2A shows a circular lens 200 having a peripheral structure 202, which may be a circular peripheral structure defining an aperture 212. The side view (top) shows peripheral structure 202, substrate 210, membrane 204, and lens fluid 208, and the face-on view (bottom) illustrates the circular shape of the peripheral structure 202 defining aperture 212. The curved dashed line 206 shows a possible membrane profile having a reduced curvature, which may correspond to a lower optical power configuration of the membrane 204. The lens fluid 208 may be located within an enclosure defined by the membrane 204, substrate 210, and peripheral structure 202. The double headed arrow between membrane 204 and curved dashed line 206 (e.g., a lower optical power membrane profile) shows the axial displacement of the membrane optical center between the respective optical states.

FIG. 2B shows a lens 240 that is similar to that discussed above in FIG. 2A, but having a non-circular peripheral structure 242 defining a non-circular aperture 252. The cross-section may be generally similar to that of a circular lens, but the membrane profile may vary due to the variable dimension of the aperture. The side-view shows membrane 244 and substrate 250. The curved dashed line 246 shows a possible reduced curvature profile of the membrane 244, which may correspond to a lower optical power configuration. The double headed arrow between membrane 244 and the curved dashed line (246) (e.g., a lower optical power membrane profile) shows the axial displacement of the membrane optical center between the respective optical states.

FIG. 3 shows an example fluid lens that may be actuated into a plano-concave configuration, according to some embodiments. The lens 300 includes peripheral structure 302, membrane 304, lens fluid 308, and substrate 310. The figure shows the membrane in a generally planar form, which may correspond to a non-actuated form. The dashed line shows a possible negative curvature, negative optical power (concave) membrane configuration.

Figure 4:
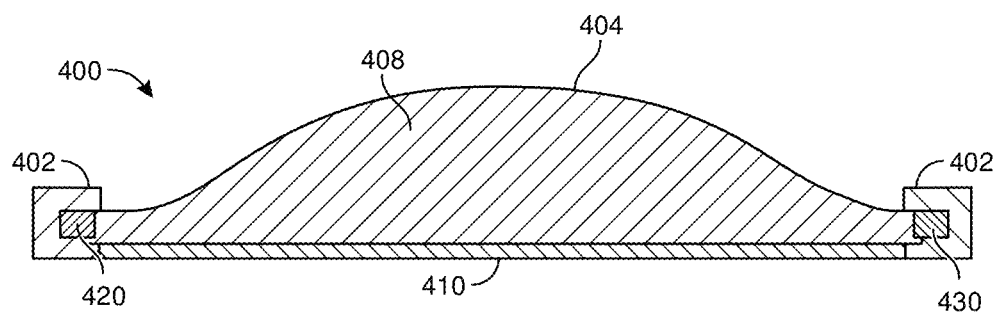
FIG. 4 illustrates possible light source and sensor locations within a fluid lens, according to some embodiments.

FIG. 4 illustrates possible light source and sensor locations. A fluid lens 400 includes peripheral structure 402, membrane 404, lens fluid 408, substrate 410, light source 420, and light sensor 430. In some examples, the light source may emit a beam of light that reflects from the interior surface of the membrane at least one time, and is received by the light sensor 430. The beam of light may pass through the lens fluid 408 and may be totally internally reflected from a surface of the membrane 404.

In some examples, a light source may emit a light beam when energized, such as a divergent light beam that includes an emission cone or an emission fan and having a range of directions. The light source may be configured to emit the light beam into the enclosure of the fluid lens, so that the light beam passes through the lens fluid. The light source (and other device electronic components) may be energized by a dedicated power supply, such as a battery within the device. Light may be reflected from the interface between a membrane and the lens fluid, and/or from the interface between the membrane and an exterior medium such as air.

Figure 5:
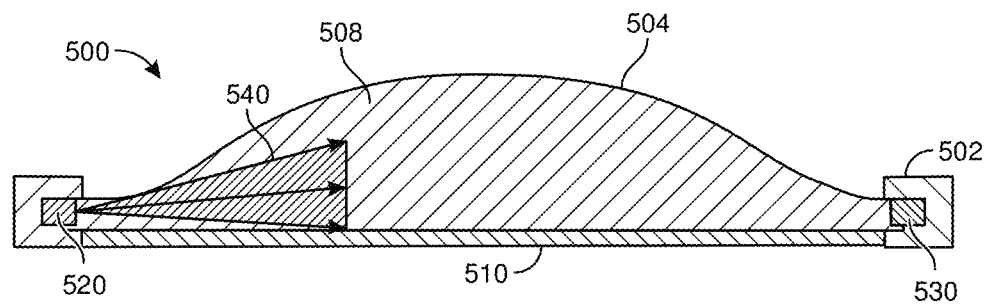
FIG. 5 illustrates a divergent light beam emitted from a light source, which may be used in some embodiments.

FIG. 5 illustrates a light beam emitted by a light source. A fluid lens shown generally at 500 may include peripheral structure 502, membrane 504, lens fluid 508, substrate 510, light source 520, and light sensor 530. In this example, the light source may emit a divergent beam 540 (e.g., a cone of light, a planar fan of light, or other beam shape such as a flattened elliptical beam). The beam direction (e.g., average or center beam direction) may be directed so that some or all of the light directions within the divergent beam 540 are reflected from the interior of the membrane 504 and received by the light sensor 530. This aspect is discussed further below. As the membrane curvature is adjusted, a variable portion of the divergent beam 540 may be reflected towards the light sensor 530. The portion of the divergent beam 540 detected by the light sensor, and hence the sensor signal, may be a function of (e.g., correlated with) the optical power of the lens.

Figure 6A:
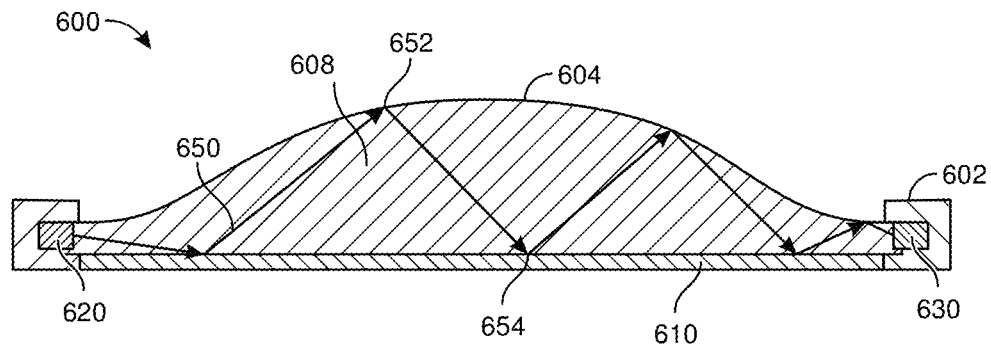
FIGS. 6A-6B illustrate reflection from within an internal surface of a fluid lens, according to some embodiments.
Figure 6B:
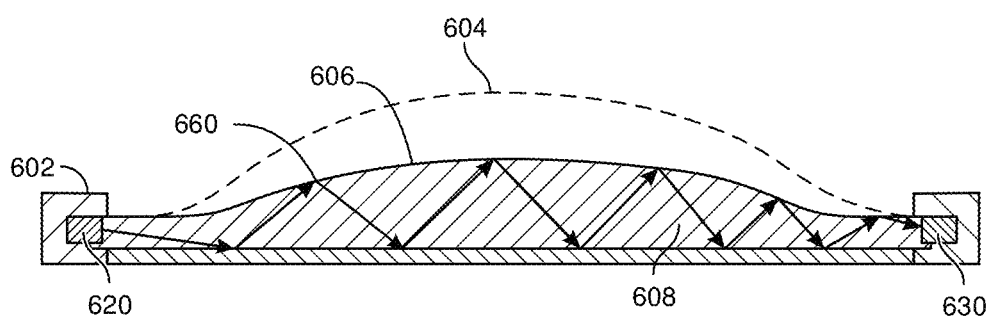

FIGS. 6A-6B illustrate reflection from a surface of a fluid lens, according to some embodiments.

FIG. 6A shows a lens 600 including peripheral structure 602, membrane 604, lens fluid 608, substrate 610, light source 620, and light sensor 630. The light beam 650 is reflected from the substrate (e.g., at 654) and from an inner surface of the lens membrane (e.g., at 652). The refractive index of the lens fluid may be higher than both that of the membrane 604, surrounding air, and of the substrate 610, and the light beam may be totally internally reflected from interfaces of the lens fluid with both the substrate and the membrane (and/or from an internal surface of the membrane adjacent exterior air).

FIG. 6B shows a similar lens to that described above in relation to FIG. 6B, with the membrane in a lower optical power configuration 606. As the curvature decreases, the angle between the light beam and the local surface normal at the first reflection from the membrane (660) increases. This may increase the proportion of light that is totally internally reflected. This is described further below.

FIG. 7 illustrates total internal reflection and partial reflection of a light beam from an interface. The figure shows a light source 720, shown emitting light beams at various angles within an optical medium 710. The optical medium has a refractive index $n_1$ and an interface 704 with an exterior medium of refractive index $n_2$, and the interface 704 is shown by a patterned line. For total internal reflection, $n_1$ may be appreciably greater than $n_2$. For example, total internal reflection may occur within water, at the interface between water and air. The incidence angle ($\theta$) for a beam incident on the interface 704 may be defined as the angle between the light beam and the local surface normal. A light beam 730 incident normally on the interface 704 between optical medium 710 and the exterior (e.g., air or a polymer membrane) has an incidence angle of zero, and this beam exits the optical medium along the same direction, shown as transmitted beam (or exit beam) 732. Beam 740 is incident on the interface 704 at incidence location 742 with incidence angle $\theta_1$, and light exits the medium as exit beam 744. A partially reflected beam 746 (shown as a dashed line) arises from partial reflection of beam 740 from the interface at the incidence location 742. Critical angle beam 750 is incident on the interface at critical incidence location 752 with an incidence angle equal to the critical angle $\theta_c$, and the exit beam 754 has an exit angle of 90 degrees. A partially reflected beam is shown as dashed line 756. This is referred to as the critical angle as the exit angle has a maximum possible value for the illustrated configuration. Any further increase in incidence angle results in elimination of the exit beam and total internal reflection of the light as a totally internally reflected beam. For example, beam 760 has an incidence angle $\theta_3$ (at incidence location 762) that is greater than the critical angle $\theta_c$, and as a result the beam is totally internally reflected and there is no exit beam.

FIG. 8 illustrates total internal reflection of a portion of emitted light beams from a light source. The figure shows light source 800, including light source 820, light source power connections 812 and 814, lens 822, and light source interface 830. The fluid lens may include lens enclosure 810 and interface 840 between the lens enclosure and an external medium such as air. The light source emits a fan of light 824 (which, as illustrated, may be a cross-section of a cone of light), which may be partially collimated by lens 822 (and/or other suitable optical components). The figure shows three representative light beams, labeled A, B, and C. Light beam C is a critical light beam having an incidence angle equal to the critical angle on the interface at incidence location 862. Light beam A has an incidence angle less than the critical angle on the interface at critical incidence location 860, and (neglecting partial reflections) light beam A exits the lens enclosure. Light beam B has an incidence angle greater than the critical angle on the interface at TIR incidence location 864, and is totally internally reflected to form the beam labelled "TIR beam" (where TIR is total internal reflection). The first portion (or refracted portion) of the fan of light between light beam A and light beam C largely exits the lens enclosure, whereas the second portion (or reflected portion) of the fan of light between light beam C and light beam B is totally internally reflected. This latter portion, the reflected portion, may be subsequently detected by a light sensor.

For illustrative simplicity, the interface 840 is drawn as a horizontal straight line. However, the interface may have a more complicated form in a fluid lens. For example, the interface may represent the configuration of a flexible membrane, which may have a curved profile. The incidence angle for a particular beam depends on the local normal where the particular beam is incident on the interface. The direction of the local normal depends on the local orientation of the membrane. The incidence angle of various light beams (e.g., light beams A, B, or C) in on the interface 840 may depend on one or more of the following factors: the orientation of the light source 820, refraction at the light source interface 830 (this is neglected for convenience in FIG. 8), and the orientation of the interface 840. This latter factor may depend on the optical power of the lens, and is now discussed in more detail.

The interface 840 is shown as a straight horizontal line in FIG. 8, but this is for illustrative clarity. As the optical power of a fluid lens increases, the membrane may develop an oblique orientation, relative to the horizontal direction (which may represent the substrate orientation). For example, if the interface 840 in FIG. 8 is rotated a few degrees anticlockwise, so that it slopes uniformly upwards from left to right, incidence angles for all beams increase. The amount of light reflected from the interface also increases, as a greater proportion of the light rays are totally internally reflected. This may result in a greater detected light intensity at the light sensor, so that the light sensor signal may be based on the optical power.

In some examples, the orientation of the light source may be adjustable. The direction of the light beams may be adjustable using one or more of reflective, refractive, or diffractive element(s). For example, the orientation of lens 822 may be adjustable. In some examples, the light source 820 may be in a horizontal configuration (e.g., parallel to a lens substrate), and the beam direction controlled by one or more adjustable mirrors.

In some examples, the light sensor may be positioned within or otherwise supported by a peripheral structure, and may be positioned to receive light reflected from an adjustable interface of the lens enclosure. The adjustable interface of the lens enclosure may include a membrane, such as an elastic membrane. In some examples, the light sensor may be located within the substrate or otherwise positioned to receive light internally reflected from an adjustable interface of the lens enclosure. The lens enclosure may be filled, at least in part, by a lens fluid. An example lens enclosure may sometimes be referred to more simply as an enclosure for conciseness. Similarly, an example lens fluid may sometimes be referred to more simply as a fluid for conciseness.

FIG. 9 shows a possible relationship 900 between sensor signal and optical power for a fluid lens, according to some embodiments. The form of the relationship may be based on one or more parameters such as device configuration, membrane refractive index, membrane thickness, lens fluid refractive index, temperature, external pressure, or other parameters. However, an example relationship may include a portion in which the sensor signal is based on the optical power of the lens, for example, in which the sensor signal increases with the optical power of the lens. This may result from, for example, a greater proportion of the light beams from the light source being totally internally reflected from a lens enclosure interface, for example, as discussed in relation to FIGS. 8 and 9.

In some examples, an electrical sensor signal may be based on an optical power of the lens, and may be used by a controller to further adjust a lens. In some examples, both a light sensor and an electrical sensor may be used.

Figure 10A:
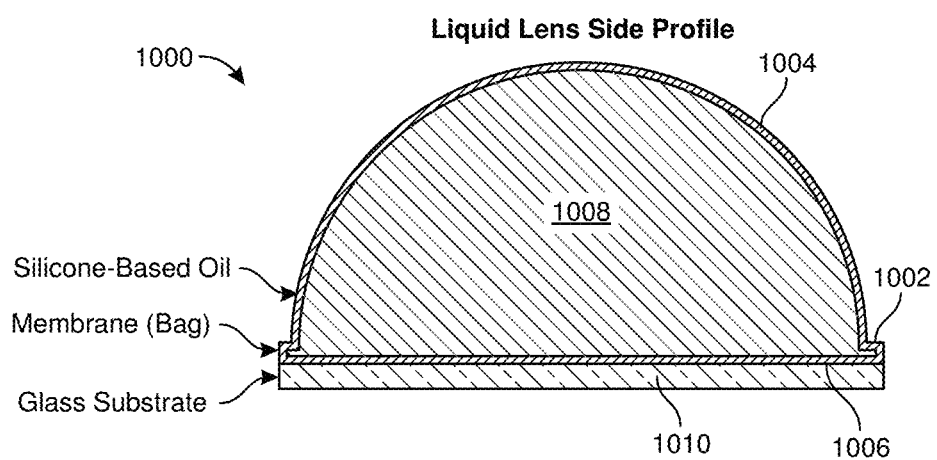
FIG. 10A-10C illustrate a fluid lens including substrate-supported electrodes that allow capacitive sensing, according to some embodiments.
Figure 10B:
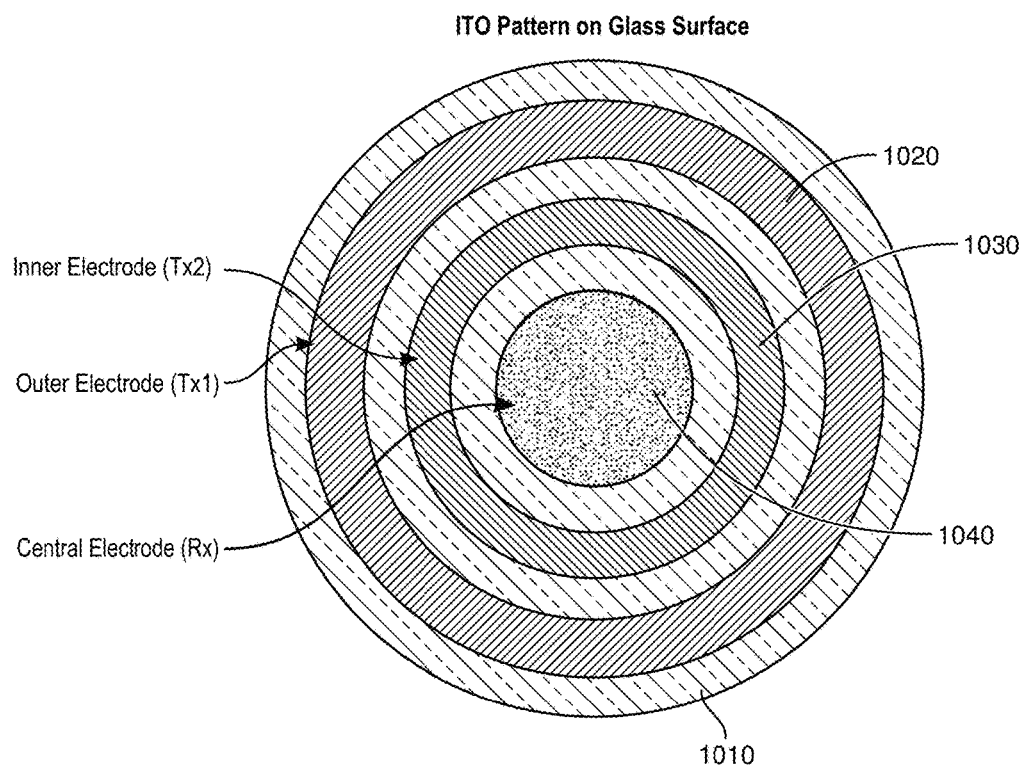
Figure 10C:
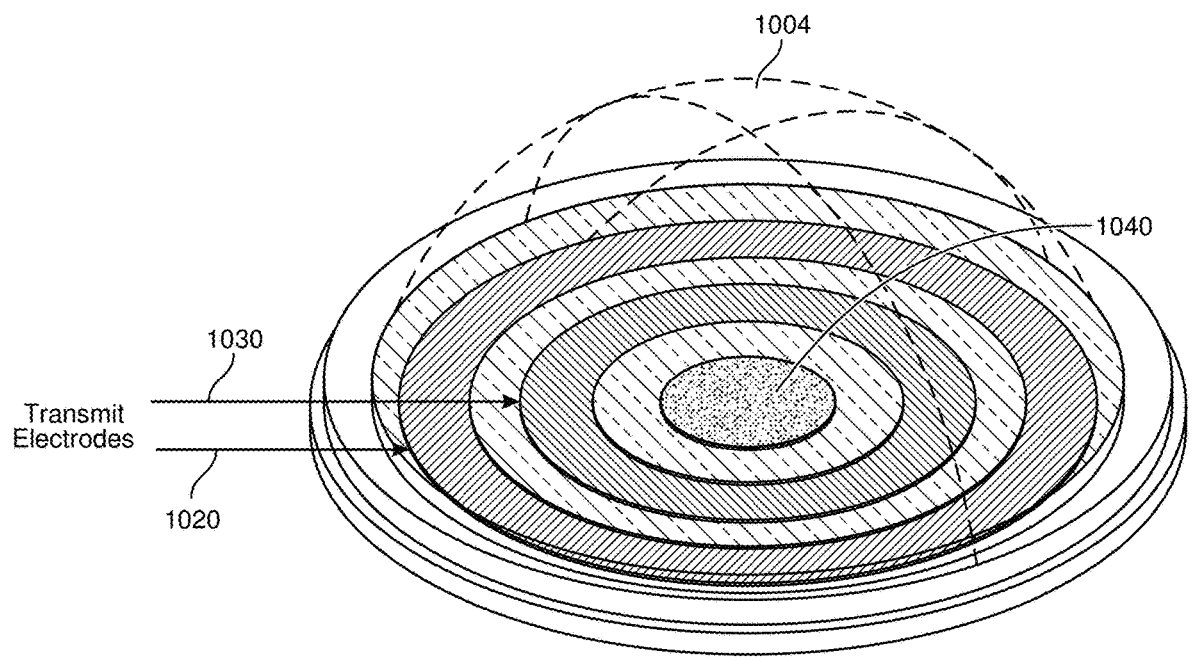

FIG. 10A-10C illustrate a fluid lens including substrate-supported electrodes that allow capacitive sensing, according to some embodiments.

FIG. 10A shows a side profile of a fluid lens, in which the membrane curvature may be exaggerated for illustrative effect. The lens 1000 includes a peripheral structure 1002, membrane 1004, lens fluid within a lens enclosure 1008, and substrate 1010. In this example, the membrane 1004 and substrate layer 1006 may, at least in part, define the lens enclosure 1008. The membrane 1004 and substrate layer 1006 may form a unitary structure, sometimes referred to as a "bag". In some examples, the substrate layer 1006 may include a layer of a flexible polymer, and may have a similar composition to that of the membrane 1004. In some examples, the substrate layer may be omitted. The substrate 1010 may include glass or a generally rigid polymer, and the substrate may be an optically transparent substrate.

FIG. 10B shows an arrangement of electrodes that may be formed on the substrate. In this example, substrate 1010 includes a circular disk (e.g., including glass and/or plastic). A surface of substrate 1010 supports three electrodes; an outer electrode 1020, an inner electrode 1030, and central electrode 1040. The electrodes may be generally coplanar. In the figure, the inner and outer electrodes are labelled as transmit electrodes and the central electrode is labeled as a receive electrode. This designation is arbitrary, but relates to the possible transmission of electromagnetic radiation between two spaced apart electrodes that may be used to determine capacitance.

In this example, the outer electrode is an outer annular electrode, the inner electrode is an inner annular electrode, and the central electrode is a central circular electrodes. The annular electrodes may be concentrically arranged around the central circular electrode. Other electrode configurations may be used.

FIG. 10C shows a perspective view of the electrodes (1020, 1030, and 1040) supported on the substrate 1010. The dashed lines illustratively represent a possible configuration of the membrane 1004. Lens components other than the substrate and electrodes are omitted for clarity.

Electrodes (e.g., electrodes supported by a substrate or a membrane) are not limited to annular and/or circular shapes. Electrodes may be disposed in any suitable configuration, and may include parallel stripe electrodes, rings, curved electrodes, or geometric shapes such as polygons or rounded shapes.

In some examples, a device may include a capacitance sensor configured to provide a ratiometric capacitance sensor signal, which may be based on a ratio of capacitances obtained between different pairs of electrodes. For example, for the configuration discussed above in relation to FIG. 10B, an inner capacitance may be determined between the inner annular electrode and the central electrode. An outer capacitance may be determined between the outer annular electrode and the central electrode. A ratiometric capacitance signal may be based on a ratio formed between the outer capacitance and the inner capacitance. Surprisingly, this example ratiometric signal has good sensitivity to the optical power, possibly because the inner and outer capacitances have different sensitivities to the membrane curvature and hence to the optical power. A ratiometric capacitance signal also has the advantage of allowing the effects of common mode factors (e.g., temperature variations) to be eliminated, improving accuracy of optical power determination using a capacitance sensor signal. Ratiometric capacitance signals may be obtained using any suitable pairs of electrodes, such as two different pairs of electrodes. Two different pairs of electrodes may have one common electrode, such as the central electrode in the example described above, and may be provided by, for example, three electrodes. In some examples, a plurality of capacitance values may be summed, and a ratiometric signal obtained by forming a ratio with another capacitance value, which may also be the sum of a second plurality of capacitance values.

Figure 11:
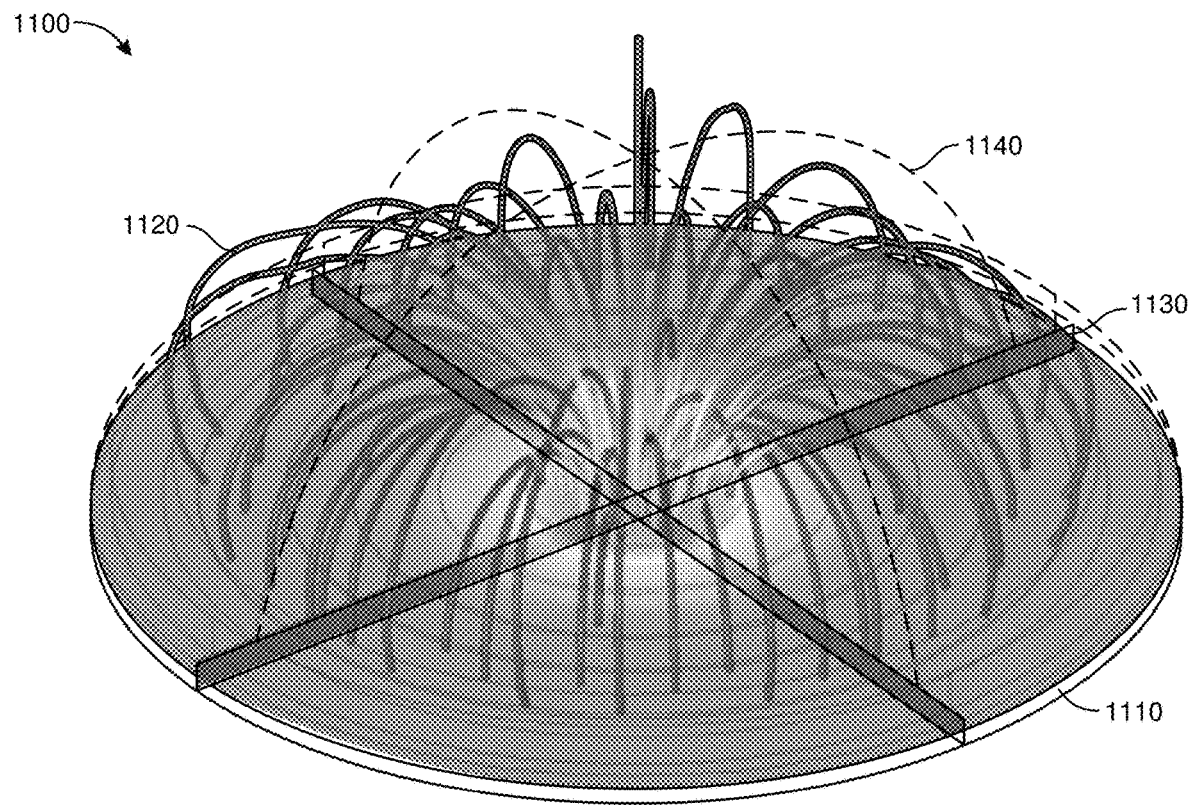
FIG. 11 illustrates field lines between electrodes formed on a substrate, according to some embodiments.

FIG. 11 shows a possible distribution of electric field lines 1120 (shown as gray solid lines) within fluid lens 1100. Electric field lines 1120 may extend between concentric electrodes arranged around a central electrode on a substrate (1110). The arrangement of electrodes may be similar to that discussed above in relation to FIGS. 10A-10C, and is more clearly shown in FIGS. 10A-10C. A possible membrane configuration is shown using dashed lines 1140. The electrodes may be generally co-planar on substrate 1110, but the electric field lines may extend away from the substrate and may become sensitive to the spatial distribution of dielectric media between the electrodes. The spatial distribution of dielectric media may include the volume of dielectric fluid enclosed by the membrane, and this may vary as a function of optical power of the lens. The crossed rectangles 1130 may generally illustrate, in a simplified manner, the directions of possible cross-sections through the lens.

Figure 12:
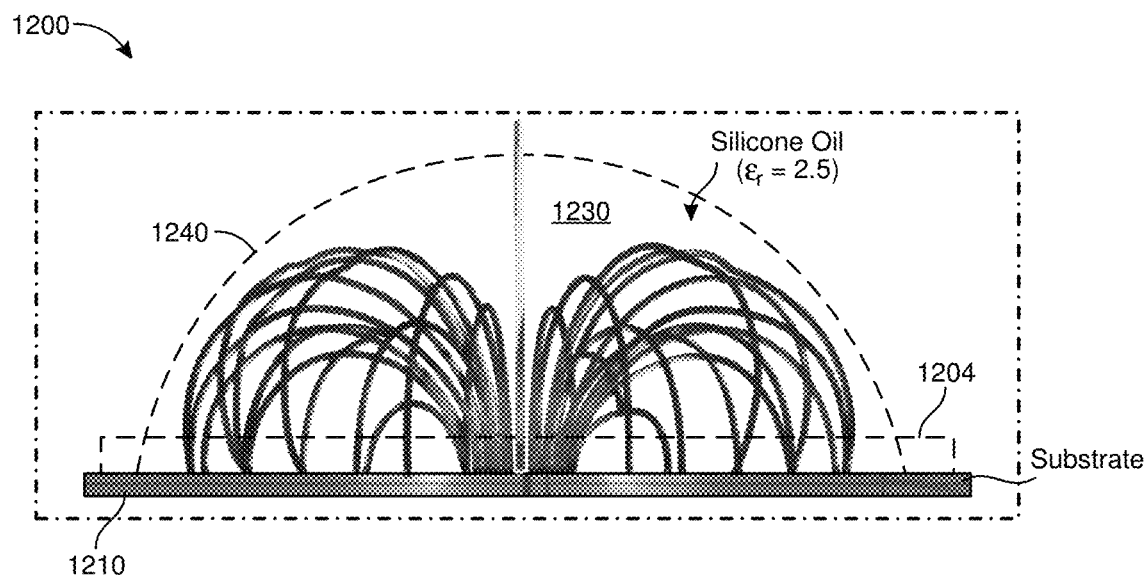
FIG. 12 further illustrates field lines between electrodes formed on a substrate, according to some embodiments.

FIG. 12 further illustrates electric field lines between concentric annular electrodes disposed around a central electrode. The device 1200, shown in cross-section, includes substrate 1210 supporting co-planar concentric electrodes (not shown in detail), but which may be similar to those discussed above in relation to FIG. 10B. An electrical potential applied between the electrodes results in electric field lines connecting the electrodes, shown as lines 1240. The first dashed line 1204 may represent the membrane configuration in a planar state. In this state, electric field lines extend out of the lens fluid 1230 (e.g., a silicone oil of relative permittivity of approximately 2.5) and into the surrounding medium, which typically may be air (e.g., a medium having a relative permittivity of approximately 1). The effective permittivity between a pair of coplanar electrodes may include contributions from air and from the lens fluid. The contribution from the lens fluid may be significantly greater than that of air. Hence, an increased amount of air between the electrodes, through which electric field lines may pass, may appreciably lower the measured capacitance between the electrodes. The second dashed line 1240 may represent the membrane configuration in high optical power state. The difference between the membrane configurations represented by dashed lines 1204 and 1240 may be exaggerated. In this configuration, the electric field lines largely pass through the lens fluid within an enclosure defined by the membrane. In this configuration, the capacitance between coplanar concentric electrodes may be appreciably higher.

In some examples, a capacitance sensor may be used to measure an inner capacitance (e.g., between an inner electrode and a central electrode) and an outer capacitance (e.g., between an outer electrode and the central electrode). Each capacitance may vary as a function of the optical power of the lens. If the lens membrane extends further from the substrate near the center of the lens, a greater proportion of field lines may pass entirely through the lens fluid, leading to an increase in the effective permittivity. The lens fluid may have an appreciably greater dielectric permittivity than that of air, and hence the measured capacitance may be greater for higher optical powers. The measured capacitance may be generally proportional to the effective permittivity between the electrodes. The effective permittivity may include contributions from the substrate, the lens fluid, the membrane, air, and possibly other lens components. At higher optical powers, the effective permittivity between the electrodes may increase, due to the greater contribution to the effective permittivity from the lens fluid.

In some examples, the lens fluid may have a higher permittivity than other lens components, such as the membrane or substrate. For example, the lens fluid may have a relative permittivity of at least approximately 2 at the frequency used to determine the capacitance between a pair of electrodes. Permittivity may be expressed as an absolute value ($\varepsilon$), or as a relative permittivity ($\varepsilon_r$) based on a ratio of the absolute permittivity ($\varepsilon$) and the permittivity of free space ($\varepsilon_0$)

Figure 13:
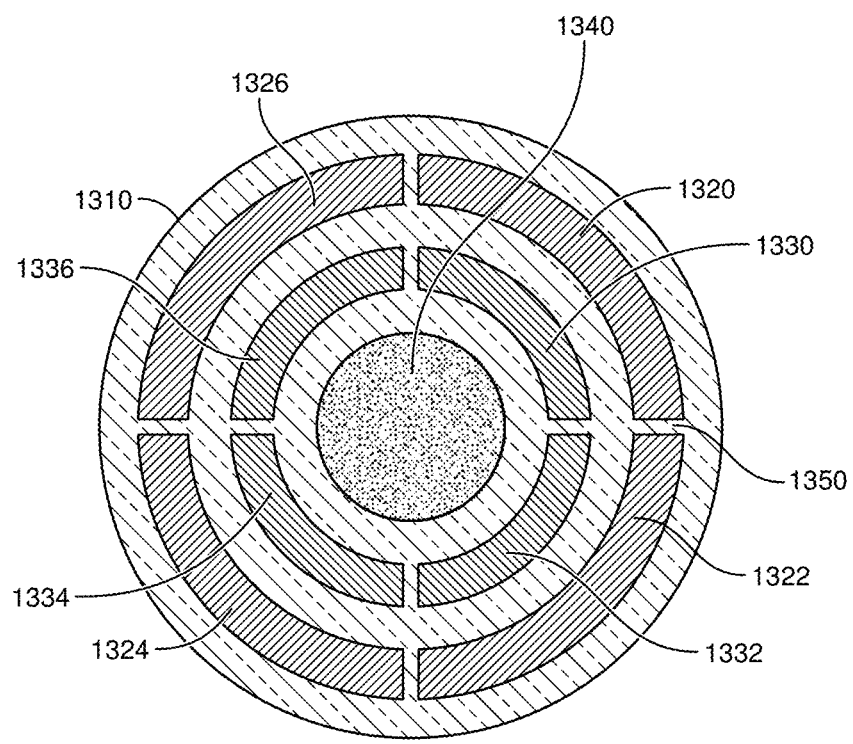
FIG. 13 illustrates an electrode arrangement on the substrate of a fluid lens, according to some embodiments.

FIG. 13 illustrates a portion of a device, including substrate 1310, outer electrode segments (1320, 1322, 1324, and 1326), inner electrode segments (1330, 1332, 1334, and 1336), and central electrode 1340. The electrodes may include a patterned electrically conductive layer formed on the substrate. The figure shows, for example, an outer electrode arrangement including four segments. However, any suitable number of segments may be used. In some examples, a capacitance may be determined between each segment and the central electrode.

One or more gaps between electrodes, such as gap 1350 of FIG. 13, may be used to route electrically conductive tracks between electrodes and electrical connections. Electrical connections may be located proximate the periphery of the substrate to facilitate connections. In some examples, electrical connections may be made through the thickness of one or more substrate layers. In some examples, an additional layer may be formed over substrate supported electrodes, such as a dielectric layer and/or a protective layer. For example, a protective layer may be configured to protect the electrodes from chemical interactions with the lens fluid.

Figure 14:
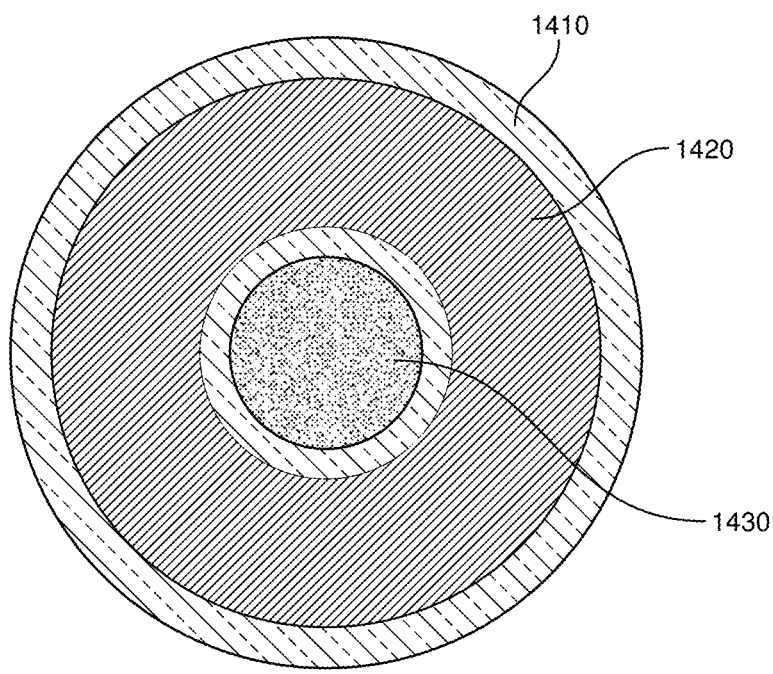
FIG. 14 illustrates an electrode arrangement on the substrate of a fluid lens showing that the outer electrode may have a greater radial extent, according to some embodiments.

FIG. 14 illustrates an example electrode arrangement, for example, on the substrate 1410 of a fluid lens. In this example, there is a single annular electrode 1420 that is generally coplanar and concentric around the central electrode 1430. This electrode may be termed an outer electrode, and in this case there is no additional inner electrode disposed around the central electrode. The inner radius, outer radius, and radial extent (difference between inner and outer radii) of the outer electrode may each be any suitable value. In this example, the outer electrode may have a greater radial extent than an outer electrode also used with an inner electrode and central electrode.

Figure 15:
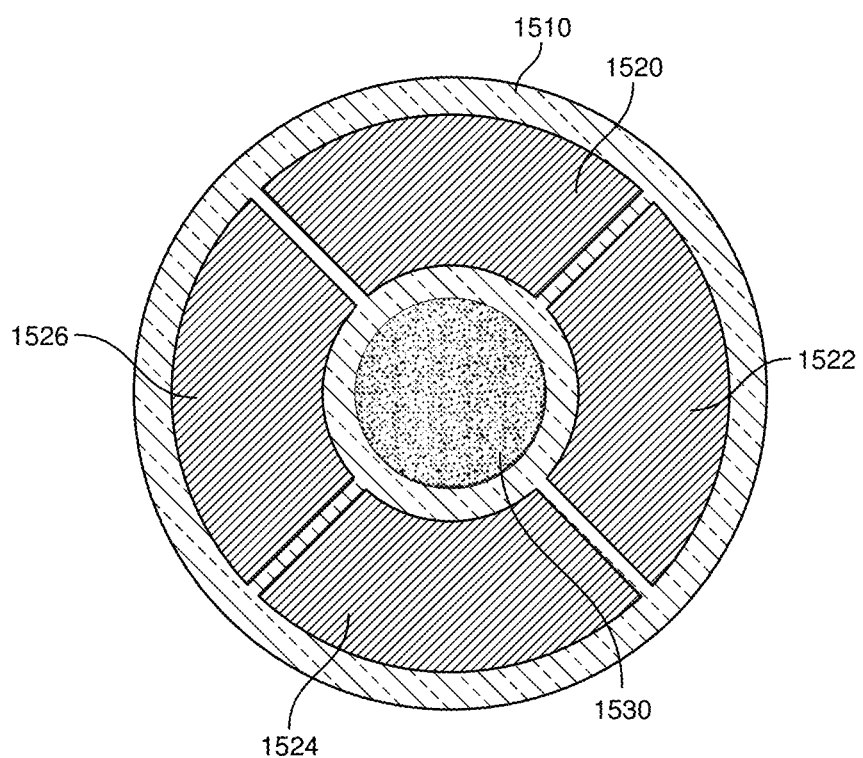
FIG. 15 illustrates a segmented outer electrode, according to some embodiments.

FIG. 15 illustrates a segmented outer electrode configuration on the surface of the substrate 1510, including electrodes 1520, 1522, 1524, and 1526 arranged as annular segments around a central electrode 1530.

Sensor signals from different segments may be used to determine additional optical parameters of the lens, such as uniformity of curvature, cylindricity, astigmatism, and the like. In some examples, multiple light sensors may be provided to determine membrane curvature along a plurality of radial directions, allowing additional optical parameters of the lens to be determined. In some examples, a membrane may develop anisotropic aging properties, and these may be detected and compensated for using multiple sensors. In some examples, sensor signals may be averaged or otherwise combined.

Figure 16:
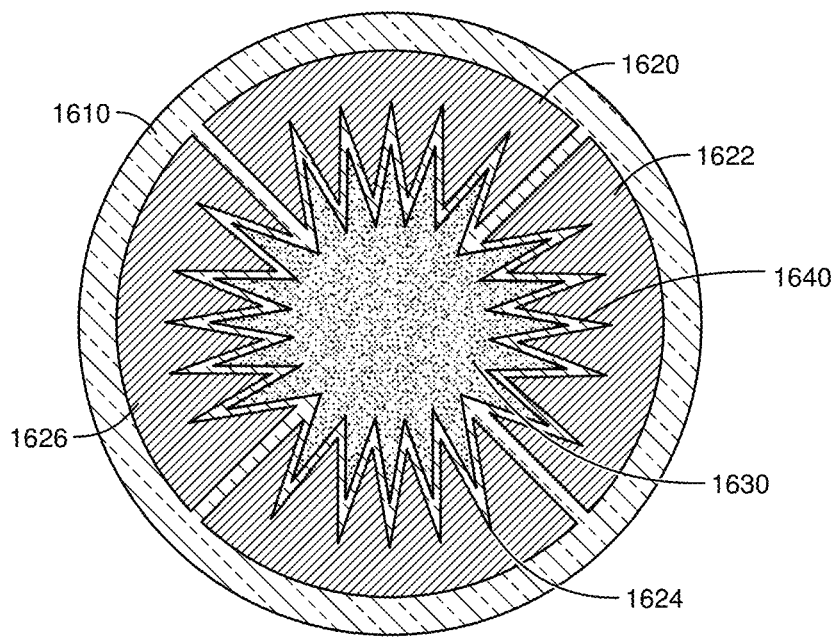
FIG. 16 illustrates a polygonal electrode configuration, according to some embodiments.

FIG. 16 illustrates an example electrode configuration in which the central electrode 1630 has a polygonal shape. In this example, substrate 1610 supports outer electrode segments 1620, 1622, 1624, and 1626, and central electrode 1630 has a polygonal shape. The illustrated shape is exemplary and not limiting. The electrode gap 1640 between the central electrode and each outer electrode segment has a jagged shape that is not linear or a smooth curve. In some examples, the electrode gap may have a jagged shape (as illustrated in FIG. 16) or a wiggly shape. A jagged shape may include a plurality of generally linear edge sections having different orientations. A wiggly shape may include one or more oscillatory or generally wavy spatial components that may vary around an otherwise smooth curve.

Figure 17:
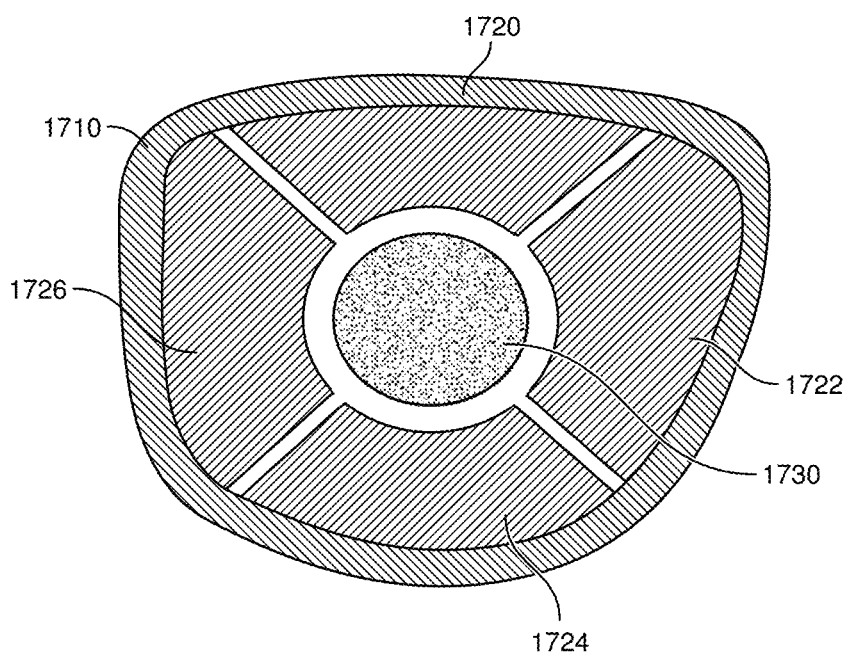
FIG. 17 illustrates a non-circular electrode configuration, according to some embodiments.

FIG. 17 illustrates an electrode configuration that may be used in a non-circular lens. The figure shows substrate 1710 supporting electrode segments 1720, 1722, 1724, and 1726 generally arranged around a central electrode 1730.

In some examples, an ophthalmic device includes a frame supporting one or more fluid lenses. Each fluid lens may include a substrate supporting an arrangement of electrodes, a peripheral structure, a membrane, and an enclosure (at least in part defined by the substrate and the membrane) enclosing a lens fluid.

In some examples, at least one electrode may be supported by a membrane, or other flexible or deformable element. For example, a fluid lens may include at least one electrode supported (or otherwise associated with) a membrane. In some examples, additional electrodes may be located on the membrane, and/or located on the substrate.

An electrode located on a membrane or on a substrate may be located on a surface of the membrane or substrate, and/or may be covered with one or more additional layers.

Figure 18A:
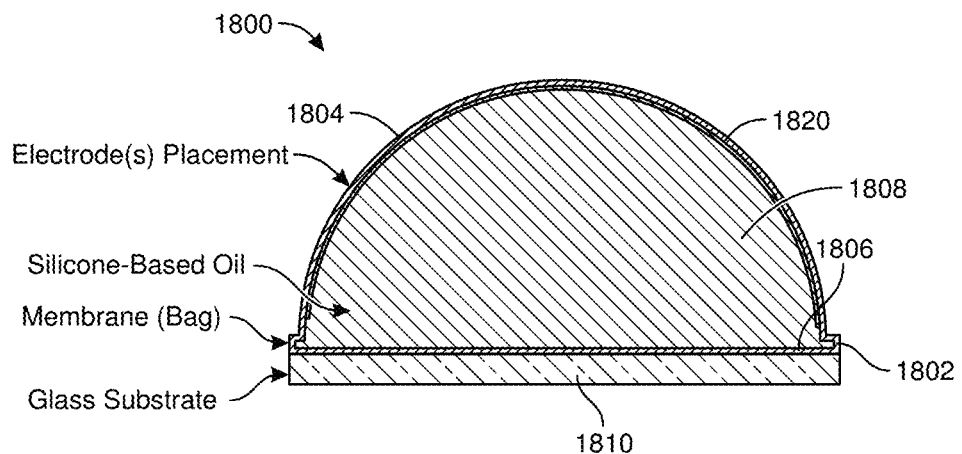
FIGS. 18A and 18B illustrate a membrane-based electrode configuration, according to some embodiments.

FIG. 18A illustrates an example device having at least one membrane-based electrode. The device 1800 includes peripheral structure 1802, membrane 1804, lens fluid 1808, substrate 1810, and membrane electrode 1820. In this example, the membrane 1804 is extended as substrate coating 1806 to define an enclosure (sometimes referred to as a "bag") for the lens fluid 1808. The membrane electrode 1820 may be a flexible electrode. In some examples, the membrane electrode 1820 may extend over an interior surface of the membrane.

In some examples, a membrane electrode (e.g., an electrode supported by or otherwise associated with a membrane) may be located on an inner surface, an outer surface, or within an interior portion of a membrane. A membrane electrode may be coated by one or more coating layers, such as a corrosion prevention layer. The membrane electrode may extend over a portion of the membrane. In some examples, capacitance may be determined between a membrane electrode and a second membrane electrode. In some examples, capacitance may be determined between a membrane electrode and a substrate electrode (e.g., an electrode located on or otherwise associated with the substrate).

FIG. 18A shows membrane electrode 1820 located on an inner surface of the membrane 1804, substantially adjacent the lens fluid. This provides illustrative simplicity. However, other electrode arrangements may be used. Electrodes may be coated with a dielectric layer, such as a polymer film. In some examples, the membrane 1804 may support multiple electrodes. In some examples, the membrane 1804 may support two or more parallel, concentric, or otherwise configured electrodes, for example, on inner and/or outer surfaces of the membrane, or within the membrane (e.g., between layers of the membrane).

In some examples, at least a portion of the membrane may include an electroactive material, such as an electroactive polymer. An electroactive polymer layer may be located between an opposed pair of electrodes, and an electric field applied between the electrodes may be used to generate an electroactive response in the polymer, such as electrostriction along a particular direction, and in some examples, expansion along an orthogonal direction. The particular direction may be parallel to an applied electric field, and the orthogonal direction may be locally parallel to the plane of the membrane (neglecting any membrane curvature).

Figure 18B:
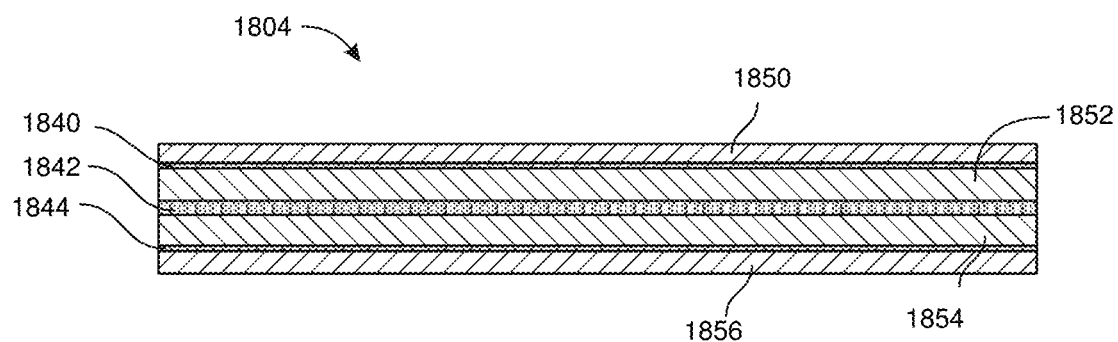

FIG. 18B shows a portion of the membrane 1804 showing an example configuration that may be used with a device such as illustrated in FIG. 18A. The membrane 1804 includes an outer layer 1850 (e.g., that may provide an outer surface adjacent the ambient environment, such as the atmosphere), outer electroactive layer 1852, inner electroactive layer 1854, and inner layer 1856. The inner layer may provide an inner surface adjacent the lens fluid. The membrane 1804 also includes outer electrode 1840, central electrode 1842, and inner electrode 1844. The outer layer 1850 may provide protection for the lens membrane, and have one or more properties such as UV (ultraviolet) blocking, low oxygen diffusion, or one or more other characteristics.

In some examples, an electric field applied between a pair of overlapping electrodes may induce an electroactive response in an intervening layer. The intervening layer may include an electroactive polymer. This approach may be used for electroactive control of the optical power of a fluid lens. For example, an electric field applied between central and outer electrodes (1842 and 1840, respectively) may induce an electroactive response in the outer electroactive layer 1852. Similarly, an electric field applied between central and inner electrodes (1842 and 1844, respectively) may induce an electroactive response in the inner electroactive layer 1854. The electroactive response may include a compression in one direction, and an expansion in an orthogonal direction. This may depend on the Poisson ratio, which is known for many electroactive polymer examples and not discussed further here. For example, the distance between the electrodes may decrease (e.g., due to electroconstriction), but the orthogonal extent of the electroactive polymer (e.g., horizontal extent, as illustrated) may increase. Electric fields applied between one or both pairs of electrodes may be used to induce expansion and/or constriction of portions of the membrane (e.g., substantially adjacent portions of the membrane), and may be used to induce curvature of the membrane and adjustment of the optical power of the lens. In some examples, electroactive control of a fluid lens may be used in addition to (or as an alternative to) the use of actuators to adjust the optical power of the lens. For example, electroactive control of a fluid lens may be used for fine control, or complete control, of the optical power of the fluid lens.

In some examples, a capacitance measured between the central electrode and one or more of the inner or outer electrodes may be used to determine the change in distance between the electrodes, and hence the degree of electroconstriction of the membrane. Capacitive feedback may then be used to modify the electroactive control of the optical power of the lens. This approach may be used in addition to, or as an alternative to, the determination of a capacitance between other pairs of electrodes to determine the optical power of the lens, or, in some examples, may be used to determine the optical power.

In some examples, one or more electrodes used for electroactive control of a fluid lens may be used to determine a capacitance that may be used to modify control of the lens, for example, in a feedback circuit.

In some examples, one or more electrodes within different portions of the membrane may be used for electroactive control of the lens, and may also be used to determine a capacitance. For example, one or both of the electrodes used for a capacitance measurement may also be used for electroactive control of the lens. In some examples, a capacitance between a membrane electrode (e.g., an inner electrode as illustrated in FIG. 18B) and a substrate electrode may be determined. The membrane electrode may also be used for electroactive control of the lens.

FIG. 19 illustrates a device having a polygonal membrane electrode configuration. In this example, device 1900 includes membrane peripheral portion 1904, outer electrode 1920, central electrode 1930, and having electrode gap 1940. The central electrode 1930 has radially extending portions 1932, which may be termed spikes and may have points such as spike point 1934. If the membrane has a generally planar configuration, the outer and central electrodes may be generally co-planar. However, as the membrane curves outwards away from the substrate, the electrodes may no longer be coplanar. The electrode gap may increase in width as the membrane curves, which may decrease the capacitance in a manner that may be relate to optical power. The radially extending portions 1932 (or spikes) may increase the capacitance between the electrodes, for example, by extending the length of the electrode gap or by generating regions of enhanced charge concentration on the spike points 1934.

A similar electrode arrangement to that shown in FIG. 19 may be used for a substrate electrode located on the substrate of the lens. Substrate electrodes may be used as an alternative to, or in addition to, membrane electrodes.

In some examples, capacitive-based or light-based sensor approaches described herein may be used as an alternative to, or in addition to, image sensor based approaches to determine lens state information (such as optical power). This is described in more detail below. In some examples, an image based approach may be used for sensor calibration.

FIG. 20 is a simplified schematic showing an optical system for fluid lens optical power monitoring using an image sensor, that may be used in combination with a capacitive and/or optical based sensor of an example fluid lens. FIGS. 20 and 21 are highly simplified, and may neglect light refraction at various elements for illustrative convenience. The figure shows an optical system including an image sensor 2000 (which may also be referred to as a camera), first and second fluid lenses (2030 and 2040, denoted LL1 and LL2 where using LL is an abbreviation for "liquid lens", a type of fluid lens), and first and second optical elements 2015 and 2020 (in this example, polarization-sensitive volume holograms PVH1 and PVH2 respectively). In some examples, an arrangement of light sources and/or detectors 2012 on substrate 2010 (e.g., an optical window or lens) may be used for eye-tracking.

An array of light sources 2052, supported on rear substrate 2050, generates an array of beams that passes through the optical system. In some examples, the array of beams (shown using representative beams labeled A and B) may be diffracted or otherwise redirected towards the image sensor 2000 by an optical element such as PVH2 (2020). Polarization-sensitive elements may be used to transmit image elements, while redirecting an array of beams. Redirection may be dynamically controlled (e.g., selectable) using either light source polarization control or using the configuration of the respective polarization-sensitive optical element. When the fluid lenses are in a planar state (e.g., a non-actuated state), the array of light sources may produce a regular array of image spots on the image detector 2070, due to the undistorted array of light beams. The image detector 2070 may represent the imaging component within the image sensor (camera) 2000. This simplified schematic (along with FIG. 21 below) does not show refraction at all interfaces for illustrative simplicity. The eye representation 2060 indicates a possible eye-side of the optical system. The rear substrate 2050 may also support or include one or more electronic displays (such as liquid-crystal displays) configured to provide augmented-reality elements to the eye of a user.

FIG. 21 shows a similar arrangement to FIG. 20, showing an optical system in which the fluid lenses LL1 (2130) and LL2 (2140) are actuated, for example, having curved membrane profiles 2132 and 2142. In some examples, LL1 may be a negative lens and LL2 may be a positive lens, as illustrated. The image sensor then detects a deformed (or warped) image, from which the optical power of one or both lenses may be determined. In some examples, lenses may be actuated sequentially as other lenses remain in an unactuated (e.g., planar) configuration. Other components or aspects, such as camera 2100 including image sensor 2170, substrate 2110, light emitters and/or light detectors 2112, first and second optical elements 2115 and 2120, light sources 2152 supported by rear substrate 2150 and producing an array of light beams such as light beam A and light beam B, and eye 2160 (indicating a possible eye-side of the optical system), may be similar to those shown in FIG. 20.

An optical system similar to that shown in FIGS. 20 and 21 may be used in addition to sensors within the fluid lens, and, in some examples, may be used to calibrate a sensor signal. A calibration process may include determining the optical power of at least one fluid lens using an array of light sources and a camera, determining a sensor signal (based at least in part on a light sensor signal and/or a capacitive sensor signal) for the at least one fluid lens, and correlating (or otherwise relating) the sensor signal to the optical power of the lens. A calibration process may be performed at intervals, for example, when the device is not in use by the user, or on receiving a user request for system calibration.

FIG. 22 illustrates an example method 2200 that may be used to determine an optical power of a fluid lens, according to some embodiments. An example method includes adjusting an optical power of a fluid lens (2210), receiving a sensor measurement from the fluid lens where the sensor measurement is correlated with the optical power (2220), and adjusting the fluid lens based on the sensor measurement (2230).

FIG. 23 illustrates an example optics-based method 2300 that may be used to determine an optical power of a fluid lens. An example method includes adjusting an optical power of a fluid lens (2310), receiving a light sensor measurement from the fluid lens (2320), where the light sensor measurement is correlated with the optical power, and adjusting the fluid lens based on the light sensor measurement (2330).

FIG. 24 illustrates an example capacitance-based method 2400 that may be used to determine an optical power of a fluid lens. An example method includes adjusting an optical power of a fluid lens (2410), receiving a capacitive sensor measurement from the fluid lens (2420), where the capacitive sensor measurement is correlated with the optical power, and adjusting the fluid lens based on the capacitive sensor measurement (2430).

A controller may be configured to determine the optical power of a liquid lens based on light propagation through the device, or the capacitance between a pair of electrodes, such as one electrode supported by a flexible membrane and another electrode supported by a relatively rigid substrate. In some examples, an adjustable fluid lens may include a capacitive sensor responsive to the optical power of the lens. In example liquid lenses, the electrode architecture may include one or both of parallel plate and co-planar configurations. For example, a substrate may include a pair of electrodes, and the capacitance between the electrodes may vary with optical power due to variations in the extent of the dielectric medium located between the electrodes. In some examples, a capacitance sensor may determine the capacitance between an electrode on the substrate and an electrode on the membrane.

In some examples, a fluid lens may include an enclosure filled (at least in part) with a lens fluid. An enclosure may be defined, at least in part, by a membrane and a substrate. In some examples, a fluid lens may not have a rigid substrate, and the enclosure may be defined, at least in part, between two membranes. For a fluid lens with two membranes, a capacitance may be measured between an electrode on a first membrane and an electrode on a second membrane.

Example devices may include one or more polymers. For example, a membrane may include one or more membrane polymer, such as one or more elastomers. A membrane polymer and/or a substrate may include one or more optically transparent polymers, and may be generally optically transparent, for example, optically transmissive over most or all of the visible wavelength range. Example polymers may include thermoplastic polymers. Example polymers may include, but are not limited to, polyolefins (e.g., polyethylene homopolymers and copolymers, polypropylene, polypropylene homopolymers and copolymers), functionalized polyolefins, polyesters, poly(ester-ether), polyamides (e.g., nylons, and poly(ether-amides), polyether sulfones, fluoropolymers, polyurethanes, and/or mixtures (e.g., blends) and/or derivatives or copolymers thereof. Other example polymers may include polyurethanes (e.g., thermoplastic polyurethanes), rubbers, vinyl arylenes, conjugated dienes, polyethers, polyisoprenes, polyneoprenes, copolymers of any of the above, and/or mixtures thereof. Example polymers may include copolymers such as poly(ethylenebutene), poly(ethylene-hexene), poly(ethylene-octene), and poly(ethylene-propylene), poly(ethylene-vinylacetate), poly (ethylene-methylacrylate), poly(ethylene-acrylic acid), poly (ethylene-butylacrylate), poly(ethylene-propylenediene), poly(methyl methacrylate), and/or polyolefin terpolymers thereof. Example polymers, such as membrane polymers, may include elastomeric polymers such as styrenic block copolymers, elastomeric olefinic block copolymers, and/or combinations thereof. Non-limiting examples of styrenic block copolymers (SBCs) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), and/or styrene-ethylene-ethylene-propylene-styrene (SEEPS) block copolymer elastomers, polystyrene, and/or mixtures thereof. Examples may include styrene polymers such as styrene-butadiene-styrene polymers, polystyrene, and/or mixtures thereof.

In some examples, a fluid lens may include one or more membranes, such as a polymer membrane. A polymer membrane may include an elastomer polymer. Membrane thicknesses may be in the range 1 micron-1 mm, such as between 3 microns and 500 microns, for example, between 5 microns and 100 microns. An example membrane, or portion thereof, may be one or more of the following: flexible, optically transparent, water impermeable, and/or elastomeric. A membrane may include one or more elastomers, such as one or more thermoplastic elastomers. A membrane may include one or more polymers, such as one or more of the following: a polyurethane (such as a thermoplastic polyurethane (TPU), a thermoplastic aromatic polyurethane, an aromatic polyether polyurethane, a cross-linked urethane polymer, other urethane polymer, or a derivative, blend, or copolymer thereof), a silicone elastomer such as an alkylsiloxane (e.g., polydimethylsiloxane), a polyolefin, a polycycloaliphatic polymer, a polyether, a polyester (e.g., polyethylene terephthalate), a polyimide, a vinyl polymer (e.g., a polyvinylidene chloride), a polysulfone, a polythiourethane, polymers of cycloolefins and aliphatic or alicyclic polyethers, a fluoropolymer (e.g., polyvinylfluoride), another suitable polymer, and/or a blend, derivative, or analog of one or more such polymers. The membrane may be an elastomer membrane, and the membrane may include one or more elastomers.

In some examples, a membrane may be an elastic membrane, or include an elastic membrane portion, and may include one or more elastomers. A membrane may include one or more polymers. In some examples, a membrane may include one or more of a silicone polymer (e.g., polydimethylsiloxane, PDMS), a urethane polymer (e.g., a thermoplastic polyurethane, TPU), a polyethylene, a polybutylene, a polypropylene, an acrylate polymer (e.g., a methacrylate polymer such as polymethyl methacrylate), a gel (e.g., a hydrogel), a fluoropolymer, or an electrically conductive polymer.

In some examples, a fluid lens may include a substrate. The substrate may be relatively rigid, and may exhibit no visually perceptible deformation due to, for example, adjusting the internal pressure of the fluid and/or tension on the membrane. A substrate may be optically transparent. In some examples, the substrate may be a generally optically transparent planar sheet. The substrate may include one more substrate layers, and a substrate layer may include a polymer, glass, optical film, and the like. Example glasses include silicate glasses, such as borosilicate glasses. In some examples, a substrate may support one or more electrodes, for example, on a surface of the substrate. In some examples, a substrate may include one or more polymers, such as an acrylate polymer (e.g., polymethylmethacrylate), a polycarbonate, a polyurethane (such as an aromatic polyurethane), or other suitable polymer. In some examples, one or both surfaces of a substrate may be planar, spherical, cylindrical, spherocylindrical, convex, concave, parabolic, or have a freeform surface curvature. One or both surfaces of a substrate may approximate a prescription of a user, and adjustment of the membrane profile (e.g., by adjustment of the membrane curvature) may be used to provide an improved prescription, for example, for reading, distance viewing, or other use. In some examples, the substrate may have no significant optical power, for example, by having parallel planar surfaces.

In some examples, a fluid lens may include an enclosure that may be filled with a fluid, such as a high refractive index fluid (such as a liquid). The fluid may also be referred to as a lens fluid, and in this context, a high refractive index fluid may have a refractive index greater than that of water for comparable ambient conditions and wavelengths. In some example, a high refractive index material such as a lens fluid may have a refractive index of at least approximately 2 at one or more visible wavelengths.

In some examples, a lens fluid may be a dielectric fluid, such as a dielectric liquid. A dielectric fluid may include polar groups that may impart an enhanced relative permittivity to the dielectric fluid, which may enhance measured values of capacitance. The frequency of capacitance measurements may be lower than that of relevant dielectric relaxation frequencies.

In some examples, a lens fluid may include a silicon-containing liquid compound, such as a silicone oil. Example silicone oils may include silicon-containing compounds including one or more aromatic moieties, such as a phenylated silicon-containing compound. In some examples, a silicon-containing liquid compound may be functionalized with one or more functional groups. Example functional groups may include one or more of hydroxyl groups, amines, amides, carboxyl groups, other acid groups, salts, halogens (e.g., fluoro groups), and the like. In some examples, a lens fluid may include a phenylated organic material such as a polyphenylether (PPE). In some examples, a lens fluid may include a thiolated aromatic component such as a polyphenylthioether.

In some examples, a lens fluid may include an oil, such as an optical oil. In some examples, a lens fluid may include one or more of a silicon-containing compound (e.g., a silicone), a thiol, or a cyano compound. The fluid may include a silicone-based fluid, which may sometimes be referred to as a silicone oil. Example lens fluids include aromatic silicones, such as phenylated siloxanes, for example, pentaphenyl trimethyl trisiloxane. Example lens fluids may include a phenyl ether or phenyl thioether. Example lens fluids may include molecules including a plurality of aromatic rings, such as a polyphenyl compound (e.g., a polyphenyl ether or a polyphenyl thioether).

In some examples, a lens fluid may include a polar liquid, such as one or more of a dipolar molecule (e.g., a haloalkane or other halogenated or other dipolar group containing molecule), a silicon-containing liquid (e.g., a silicone oil), or other fluid (e.g., a dielectric liquid), such as optical fluids known in the art.

In some examples, the optical power of a lens may be controllable using a peripheral structure, or one or more components thereof. In some examples, a peripheral structure may include one or more actuators, and the one or more actuators may be configured to control both (or either of) the height and/or radial distance of one or more of the peripheral portions of the membrane, thereby adjusting the optical power of the lens. A peripheral structure may include one or more support structures that may be configured to guide a control point of a membrane along a guide path.

In some examples, one or more actuators may be used to control the line tension of an elastic membrane. A substrate may include a relatively rigid material (such as a glass, polymer, ceramic, or other suitable material), such as a rigid optical polymer. In this context, a rigid lens component may show no or little appreciable deformation as the optical power of the lens is adjusted. In some examples, a fluid lens may further include an edge seal, for example, a deformable component, such as a polymer film, configured to retain the fluid in the lens. The edge seal may connect a peripheral portion of the membrane to a peripheral portion of the substrate, and may include a thin flexible polymer film. The lens fluid may be contained by an enclosure, defined by one or more of the membrane, edge seal, or substrate. In some examples, the lens fluid may be enclosed by a structure sometimes referred to as a "bag", which may include a membrane, an edge seal, and a layer supported by the substrate.

In some examples, the volume of the lens fluid may remain generally constant during actuation of the lens. For example, as a peripheral portion of the membrane is moved towards the substrate (e.g., using one or more actuators), a central portion of the membrane may move away from the substrate. This may correspond to an increase in an optical power of the lens. In some examples, a rigid, semi-rigid, or wire-like element may surround the periphery of the membrane, and may be acted on by one or more actuators to adjust the optical power of the lens.

In some examples, a membrane may include one or more control points. Control points may include locations proximate the periphery of the membrane, movement of that may be used to control one or more optical properties of a fluid lens. In some examples, the movement of the control point may be determined by the movement of a membrane attachment along a trajectory (or guide path) determined by a support structure. In some examples, a control point may be provided by an actuation point, for example, a location on a peripheral structure, such as a membrane attachment, that may have a position adjusted by an actuator. In some examples, an actuation point may have a position (e.g., relative to the substrate) controlled by a mechanical coupling to an actuator. A membrane attachment may mechanically interact with a support structure, and may be, for example, moveable along a trajectory (or guide path) determined by the support structure (e.g., by a slot or other guide structure). Control points may include locations within an edge portion of a membrane that may be moved, for example, using an actuator, or other mechanism. In some examples, an actuator may be used to move a membrane attachment (and, e.g., a corresponding control point) along a guide path provided by a support structure, for example, to adjust one or more optical properties of the fluid lens. In some examples, a membrane attachment may be hingedly connected to a support structure at one or more locations, optionally in addition to other types of connections. A hinged connection between the membrane and a support structure may be referred to as a hinge point.

Electrodes may be formed by any suitable process, such as vacuum deposition, spray deposition, adhesion (e.g., lamination), spin coating, and/or any other suitable technique. Electrodes may have a thickness of between 1 nm and 100 microns, for example, between 100 nm and 10 microns, such as between 500 nm and 5 microns. In some examples, an electrode may include a thin film having a thickness between 1 micron and 2 mm, such as between 2 microns and 1 mm. Example electrodes, such as electrodes associated with a membrane, may be flexible and/or elastomeric. Example electrodes may include a thin film of electrically conductive and semi-transparent or effectively transparent material.

Electrodes may be formed on a substrate, on a membrane, or within interior portions of a substrate or membrane. For example, a lens component may be formed as a multi-layer structure, and an electrode may be formed on a first layer and coated with a second layer.

Example electrodes may include one or more electrically conductive materials, such as a metal (e.g., aluminum, silver, gold, copper, indium, gallium, zinc, or other metal), a carbon-based material (e.g., graphite, graphene, carbon black, carbon nanotubes, and the like), semimetals, or a semiconductor (e.g., a doped semiconductor such as silicon, germanium, or semiconductor compounds including silicon and/or germanium). Example electrodes may include metal grids, nanowire meshes, thin metal films, or one or more transparent conductive oxides (TCOs). Example TCOs may include metal oxides (e.g., tin oxide, indium tin oxide, barium stannate, strontium vanadate, calcium vanadate, and the like), doped compounds such as doped binary compounds (e.g., aluminum-doped zinc-oxide (AZO) and indium-doped cadmium-oxide), or and other electrically conducting transparent metal oxides. Example electrodes may include one or more electrically conductive polymers, such as thiophenes (e.g., poly(3,4-ethylenedioxythiophene), poly(4,4-dioctyl cyclopentadithiophene), and the like), combinations of thiophenes and sulfonates (e.g., poly(3,4 ethylene dioxythiophene)-poly(styrene sulfonate), PEDOT: PSS), or other electrically conductive polymers such as polymers having extensive electrode delocalization. In some examples, an electrode may include one or more polymers, including at least one polymer that may be doped to enhance electrical conductivity (e.g., with one or more dopants such as iodine, 2,3-dichloro-5,6-dicyano-1,4-benzoquinone (DDQ), or other suitable dopant).

In some examples, electrodes may be generally transparent (e.g., over visible wavelengths and/or other wavelengths of interest), optically absorbing at one or more wavelengths, or partially reflective. Electrodes may include one or more electrically conductive materials, such as one or more of a metal, an electrically conductive metal oxide (e.g., a TCO such as discussed above, e.g., indium tin oxide, tin oxide, or other conductive oxides), electrically conductive polymers (e.g., polymers having appreciable electron delocalization, ionic polymers, doped polymers, and blends or derivatives thereof), or one or more other suitable electrically conductive materials.

In some examples, a light source used in a device, such as a fluid lens (e.g., in combination with a light sensor in a total internal reflection based sensor) may include an electroluminescent device, such as a light-emitting diode, laser, or other emissive device. In some examples, a light source may be configured to emit a light beam having one or more visible wavelengths.

In some examples, a light source may emit a light beam such as a visible light beam and/or a near-IR (near-infrared) light beam. In some examples, a light source may be configured to emit an IR light beam, for example, a near-IR light beam (e.g., having a wavelength between approximately 0.75 microns and approximately 3 microns, such as approximately 1.5 microns). In some examples, a light source may emit a divergent light beam having a range of propagation directions (e.g., an emission cone or fan), which may be used to help obtain an analog-like response of light sensor output versus optical power. In some examples, spectral dispersion of a multi-wavelength beam (e.g., a white light beam) may be used to obtain a variety of critical angles (e.g., due to optical dispersion of the lens fluid), which may be used to help obtain an analog-like response of light sensor output versus optical power of the lens.

Example light sensors may include photodiodes, CMOS sensors, photoresistors, and the like. The light sensor may be configured to be electrically responsive to light of one or more wavelengths emitted by the light source.

In some examples, a controller may be configured to adjust a control signal based on a sensor signal. The control signal may include an electric signal applied between a pair of electrodes such as between membrane electrodes to obtain an electroactive response, a control signal used to drive an actuator, or otherwise used to adjust the optical power of a fluid lens. In some examples, the control signal may include a direct component and/or an alternating component of one or more frequency components. In some examples, different signal frequencies may be used for effectively simultaneous capacitance measurements and for device control.

In some examples, the sensor signal may be used in a closed-loop feedback system used to control the optical power of a fluid lens. The sensor signal may be used to verify that a desired optical power has been achieved, and/or used to provide correction data based on a difference between the actual optical power achieved and the intended optical power. If the actual optical power (determined from the sensor signal) differs significantly from the intended optical power (e.g., by more than approximately 1%), then the control signal may be modified. In some examples, the sensor date may be used to modify a lookup table used to determine the control signal parameters (such as voltage, current, or other electrical parameter) from a desired device adjustment.

In some examples, a device may be an actuator or a transducer, for example, a component of a haptic device. A capacitance sensor may be configured to determine the capacitance between electrodes at different locations on the device, and provide a sensor signal correlated with a degree of actuation. An optical sensor may be configured to provide a sensor signal correlated with a degree of actuation, for example, using a light beam internally reflected from within a device element. A sensor signal may vary as a function of the degree of actuation, and sensor signal data and/or degree of actuation data may be provided to the controller. The actual degree of actuation determined from the sensor signal may be compared with the intended degree of actuation corresponding to the control signal provided to the device. The sensor signal may be used to adjust the control signal provided to the actuator. In some examples, a comparison between the actual and intended degrees of actuation may allow modification of the control signal, and in some examples may be used to determine an external force acting on a device, such as a user-exerted force or a preload force.

The capacitance between parallel electrodes may be determined using Equation 1 below:

$$C = \frac{dQ}{dV} = \epsilon_0 \epsilon_r \frac{A}{d} \quad \text{(Equation 1)}$$

In some examples, the electrodes may not be parallel, and may be co-planar. However, an equation similar to Equation 1 may be used as an approximation, where the relative permittivity ($\epsilon_r$), area (A), and distance (d) may all be effective values. For example, the effective relative permittivity may increase as the volume of lens fluid between the electrodes increases. The effective distance may increase as the electrodes move apart, for example, as a membrane moves away from the substrate (e.g., for electrodes on the substrate and membrane), or as the membrane is stretched (e.g., for a pair of electrodes on the membrane).

A device may include one or more membranes, which may have similar or different properties (e.g., rigidity, thickness, transparency, elasticity, or other property). In some examples, a device may include a pair of membranes defining an enclosure, with the membranes having different elasticities, and the more elastic membrane may be used to provide a curved surface (e.g., to obtain an optical power, haptic signal, other displacement output, or receive a touch input from a user). At least one membrane may be used to support one or more electrodes used to provide a capacitance sensor signal.

The capacitance between a pair of electrodes within an example device may be used to provide a sensor signal. There may be one or more sensor signals measurable for a device (such as a fluid lens or a transducer), depending on the number and arrangement of electrodes. In some examples, sensor signals may be averaged. In some examples, multiple sensor signals may be used to determine additional optical parameters, such as cylindricity and/or astigmatism. In some examples, a ratio may be obtained of two capacitance values, and the sensor signal may be a ratiometric sensor signal.

In some examples, a capacitance sensor may include a signal source generating an alternating signal, allowing the impedance of the capacitor formed by the electrodes (which may be termed a device capacitance) to be determined for the known signal frequency, and hence the device capacitance to be determined. In some examples, a capacitance sensor may include a timing circuit that uses a capacitance to be determined to influence a measured time period or frequency. In some examples, a capacitance sensor may include a bridge circuit (e.g., including a known capacitance), allowing the device capacitance to be determined.

Examples also include methods of operating a device, such as a fluid lens, actuator and/or sensor that may include at least one membrane, such as a thin flexible or elastic membrane. In some examples, a method may include adjusting a control signal provided to the device using a controller to obtain a displacement of at least a portion of the device, such as at least a portion of the membrane, and determining a sensor signal to determine the actual displacement. In this context, the displacement may represent an adjustment of optical power, a degree of actuation, or similar parameter. In some examples, the control signal may then be adjusted based on the sensor signal. In some examples, the displacement determined based on the sensor signal may be compared with a desired displacement, and the control signal may be modified to reduce the difference between the determined displacement and the desired displacement. In some examples, an external force acting on the device (e.g., pushing against the membrane) may be determined, allowing sensor applications.

The configuration of a deformable element, such as a membrane, may be modified by adjusting a control signal provided to the device, such as an electric potential between a pair of electrodes, one or both of which may be located on the membrane. The displacement of a portion of the membrane may be adjusted by modifying the control signal, which may be used to adjust an optical property or to provide a perceptible haptic signal (such as a perceptible tactile sensation) to a user. However, in some applications, the actual displacement may be influenced by other factors, such as ambient conditions or a resisting force applied to the membrane by the user. Hence, it may be useful to determine the actual displacement (e.g., of the membrane) using a sensor signal, using optical and/or electrical methods such as those described herein, and further to modify the control signal according to the sensor signal.

In some examples, a capacitive sensor and/or optical sensor may be integrated with a device (e.g., a fluid lens, or an actuator such as an electrostatic or piezoelectric haptic actuator) to provide real-time feedback and dynamic control of the device. An example device may include a pair of opposed electrodes separated by a fluid, such as a lens fluid, with one or more electrodes supported by a deformable membrane. The membrane shape, such as the curvature and/or the displacement of at least a portion of the membrane, may be modified by adjusting a control signal, such as an actuator control signal, or the electric potential between a pair of electrodes, one or both of which may be located on the membrane. A sensor signal, such as an optical or capacitance measurement, may then be used to determine the membrane shape (such as the membrane curvature and/or a displacement output of an actuator).

In some examples, a comparison of a measured degree of displacement and an intended degree of displacement may allow the controller to be adjusted so that the actual degree of displacement (e.g., membrane displacement) obtained for a particular control signal (e.g., a voltage, current, or other parameter) is closer to the intended degree of actuation. For example, a controller may be adjusted by modification of a lookup table.

In some examples, a sensor-based feedback system (e.g., including an optical or capacitance sensor) may be used to modify operation of a device. In some examples, a controller may be configured to apply an control signal to modify a device configuration, and the controller operation may be modified based on a sensor signal. The sensor signal may include, for example, a capacitance determined between a pair of electrodes, which may include one or more of the electrodes between which the control signal is applied, and/or may include at least one different electrode. In some examples, one or more sensor signals may be used to determine a non-actuated configuration of a device. In some examples, a non-actuated configuration may be used to calibrate the sensor signal. For example, sensor signals may be calibrated with the fluid lens in planar membrane state. In some examples, a sensor signal may be used to provide feedback that is then used to adjust the control signal applied to the device to obtain a desired optical power. In some examples, a sensor signal may be used to modify the behavior of the device in response to an applied voltage; for example, to obtain a desired optical power-actuation voltage curve.

Capacitive and/or optical sensor signals may be used in various device examples, including optical devices such as liquid lenses where sensor signal based feedback may be used to monitor and/or modify the control signal used to adjust the optical power of the lens. In an example fluid lens, the electrode arrangement may include parallel and/or coplanar electrode configurations. In some examples, a fluid lens may include electrodes on the same substrate or membrane, and/or on a substrate and a membrane. Capacitive or optical sensing may be used to monitor and adjust the operation of devices such as fluid lenses, or transducers such as actuators and/or sensors.

In some examples, a fluid lens may include a membrane (e.g., a flexible and/or elastic membrane), a sensor, and a controller configured to adjust an optical power of the fluid lens using a control signal. The controller may be configured to modify the optical power of the lens, and to further adjust the optical power of the lens based on the sensor signal. The sensor may include an optical sensor configured to provide a sensor signal responsive to an intensity change of a light beam projected into the fluid lens and internally reflected within the fluid lens. The sensor may include a capacitance sensor configured to determine a capacitance measurement between first and second electrodes. Example devices may include one or more flexible membranes that may, at least in part, define an enclosure that is at least partially filled with a lens fluid. Examples also include associated methods and systems.

In some examples, a fluid lens (e.g., a liquid lens) may include a feedback system in which the lens actuation may be modified by real-time sensing of the optical power of the lens. The lens may be a varifocal fluid lens including a flexible transparent membrane, a substrate, and a lens fluid enclosed between the membrane and the substrate. In example optical approaches, a light beam may propagate into the lens fluid and be totally internally reflected from the lens-air interface. There may be multiple reflections. A light sensor may detect the reflected light, and the detected intensity may be used to determine the optical power of the lens. In some examples, the light source may produce a divergent beam (e.g., a cone of light) of which only certain angles are totally internally reflected, depending on the actuation state of the lens. One or more sensors (e.g., photodiodes) may be used. An optical sensor may be used to monitor for aging effects (e.g., of the light source or fluid). In electrical approaches, electrodes may be formed on the substrate (and, in some examples, on the membrane), and a measured capacitance may vary as a function of the lens power. In some examples, lens membranes may already include electrodes for actuation of an electroactive element of the membrane polymer, and these electrodes may also be used for capacitance measurements (e.g., between membrane and substrate electrodes, or between membrane electrodes). In some approaches, membrane electrodes are not used, and the substrate may support the electrodes. An example arrangement of electrodes on the substrate includes a central electrode, an inner annular electrode, and an outer annular electrode. The capacitance may be determined between the inner electrode and central electrode (which may be sensitive to lens adjustment), and between the outer electrode and the central electrode (which is may be less sensitive to lens adjustment). A variety of additional electrode arrangements of various sizes and shapes may also be used. Forming a capacitance ratio allows many common mode error sources to be eliminated, such as temperature. In some examples, a non-actuated membrane state (e.g., a planar membrane configuration) may be used to perform system checks.

EXAMPLE EMBODIMENTS

Embodiments Example light sensors may include photodiodes, CMOS sensors, photoresistors, and the like. The light sensor may be configured to be electrically responsive to light of one or more wavelengths emitted by the light Example 1. A device may include a membrane having a membrane curvature, a substrate, an enclosure defined at least in part by the membrane and the substrate and enclosing a lens fluid, a peripheral structure configured to adjust the membrane curvature, a sensor configured to provide a sensor signal that is a function of the membrane curvature, and a controller configured to: adjust the membrane curvature using a control signal, receive the sensor signal from the sensor, and modify the control signal based on the sensor signal.

Example 2. The device of example 1, where the membrane is an elastic membrane, the substrate is an optically transparent substrate, and the device has an optical power based on the membrane curvature.

Example 3. The device of any of examples 1 or 2, where the sensor signal is a function of the optical power of the device.

Example 4. The device of any of examples 1-3, where the sensor signal is a light sensor signal or a capacitance sensor signal.

Example 5. The device of any of examples 1-4, where the device further includes a light source, configured to provide a light beam when energized, and a light sensor, configured to receive light from the light beam, where the sensor signal is based at least in part on a light sensor signal provided by the light sensor.

Example 6. The device of example 5, where the light source is configured to direct the light beam into the enclosure.

Example 7. The device of examples 5 or 6, where the light sensor is configured to receive the light from a portion of the light beam that is totally internally reflected within the enclosure.

Example 8. The device of any of examples 5-7, where the light sensor is configured to receive at least a portion of the light beam that is totally internally reflected from a surface of the membrane.

Example 9. The device of any of examples 5-8, where the light beam is a divergent light beam, a portion of the divergent light beam is totally internally reflected from a surface of the membrane, the portion of the divergent light beam is a function of the membrane curvature, and the light sensor is configured to receive the portion of the divergent light beam.

Example 10. The device of any of examples 5-9, where the light source includes a laser or a light-emitting diode.

Example 11. The device of any of examples 5-10, where the light beam is a visible light beam or near-IR light beam.

Example 12. The device of any of examples 5-11, where the light sensor includes a photodiode or photoresistor.

Example 13. The device of any of examples 1-12, where the device further includes a first electrode, a second electrode, and a capacitance sensor configured to provide a capacitance sensor signal based on a capacitance between the first electrode and the second electrode, where the sensor signal is based at least in part on the capacitance sensor signal.

Example 14. The device of example 13, where the first electrode and the second electrode are generally coplanar.

Example 15. The device of examples 13 or 14, where the first electrode is supported by the substrate.

Example 16. The device of any of examples 13-15, where the second electrode is supported by the substrate.

Example 17. The device of any of examples 13-16, where the second electrode is supported by the membrane.

Example 18. The device of any of examples 13-17, where the capacitance sensor signal is a ratiometric capacitance signal based on a ratio of the capacitance between the first electrode and the second electrode to a second capacitance.

Example 19. The device of any of examples 13-18, where the membrane includes an electroactive material located between a pair of electrodes, the membrane curvature is adjustable based on an electric potential applied between the pair of electrodes, and the pair of electrodes includes the first electrode.

Example 20. An example method may include adjusting an optical power of a fluid lens using a control signal, determining the optical power of the fluid lens using a sensor signal, and modifying the control signal based on the sensor signal, where the sensor signal is a light sensor signal or a capacitance sensor signal.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 2500 in FIG. 25) or that visually immerses a user in an artificial reality (such as, e.g., virtual-reality system 2600 in FIG. 26). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 25, augmented-reality system 2500 may include an eyewear device 2502 with a frame 2510 configured to hold a left display device 2515(A) and a right display device 2515(B) in front of a user's eyes. Display devices 2515(A) and 2515(B) may act together or independently to present an image or series of images to a user. While augmented-reality system 2500 includes two displays, embodiments of this disclosure may be implemented in augmented-reality systems with a single NED or more than two NEDs.

In some embodiments, augmented-reality system 2500 may include one or more sensors, such as sensor 2540. Sensor 2540 may generate measurement signals in response to motion of augmented-reality system 2500 and may be located on substantially any portion of frame 2510. Sensor 2540 may represent one or more of a variety of different sensing mechanisms, such as a position sensor, an inertial measurement unit (IMU), a depth camera assembly, a structured light source and/or detector, or any combination thereof. In some embodiments, augmented-reality system 2500 may or may not include sensor 2540 or may include more than one sensor. In embodiments in which sensor 2540 includes an IMU, the IMU may generate calibration data based on measurement signals from sensor 2540. Examples of sensor 2540 may include, without limitation, accelerometers, gyroscopes, magnetometers, other suitable types of sensors that detect motion, sensors used for error correction of the IMU, or some combination thereof.

In some examples, augmented-reality system 2500 may also include a microphone array with a plurality of acoustic transducers 2520(A)-2520(J), referred to collectively as acoustic transducers 2520. Acoustic transducers 2520 may represent transducers that detect air pressure variations induced by sound waves. Each acoustic transducer 2520 may be configured to detect sound and convert the detected sound into an electronic format (e.g., an analog or digital format). The microphone array in FIG. 25 may include, for example, ten acoustic transducers: 2520(A) and 2520(B), which may be designed to be placed inside a corresponding ear of the user, acoustic transducers 2520(C), 2520(D), 2520(E), 2520(F), 2520(G), and 2520(H), which may be positioned at various locations on frame 2510, and/or acoustic transducers 2520(I) and 2520(J), which may be positioned on a corresponding neckband 2505.

In some embodiments, one or more of acoustic transducers 2520(A)-(J) may be used as output transducers (e.g., speakers). For example, acoustic transducers 2520(A) and/or 2520(B) may be earbuds or any other suitable type of headphone or speaker.

The configuration of acoustic transducers 2520 of the microphone array may vary. While augmented-reality system 2500 is shown in FIG. 25 as having ten acoustic transducers 2520, the number of acoustic transducers 2520 may be greater or less than ten. In some embodiments, using higher numbers of acoustic transducers 2520 may increase the amount of audio information collected and/or the sensitivity and accuracy of the audio information. In contrast, using a lower number of acoustic transducers 2520 may decrease the computing power required by an associated controller 2550 to process the collected audio information. In addition, the position of each acoustic transducer 2520 of the microphone array may vary. For example, the position of an acoustic transducer 2520 may include a defined position on the user, a defined coordinate on frame 2510, an orientation associated with each acoustic transducer 2520, or some combination thereof.

Acoustic transducers 2520(A) and 2520(B) may be positioned on different parts of the user's ear, such as behind the pinna, behind the tragus, and/or within the auricle or fossa. Or, there may be additional acoustic transducers 2520 on or surrounding the ear in addition to acoustic transducers 2520 inside the ear canal. Having an acoustic transducer 2520 positioned next to an ear canal of a user may enable the microphone array to collect information on how sounds arrive at the ear canal. By positioning at least two of acoustic transducers 2520 on either side of a user's head (e.g., as binaural microphones), augmented-reality device 2500 may simulate binaural hearing and capture a 3D stereo sound field around about a user's head. In some embodiments, acoustic transducers 2520(A) and 2520(B) may be connected to augmented-reality system 2500 via a wired connection 2530, and in other embodiments acoustic transducers 2520(A) and 2520(B) may be connected to augmented-reality system 2500 via a wireless connection (e.g., a BLUETOOTH connection). In still other embodiments, acoustic transducers 2520(A) and 2520(B) may not be used at all in conjunction with augmented-reality system 2500.

Acoustic transducers 2520 on frame 2510 may be positioned in a variety of different ways, including along the length of the temples, across the bridge, above or below display devices 2515(A) and 2515(B), or some combination thereof. Acoustic transducers 2520 may also be oriented such that the microphone array is able to detect sounds in a wide range of directions surrounding the user wearing the augmented-reality system 2500. In some embodiments, an optimization process may be performed during manufacturing of augmented-reality system 2500 to determine relative positioning of each transducer 2520 in the microphone array.

In some examples, augmented-reality system 2500 may include or be connected to an external device (e.g., a paired device), such as neckband 2505. Neckband 2505 generally represents any type or form of paired device. Thus, the discussion of neckband 2505 may also apply to various other paired devices, such as charging cases, smart watches, smart phones, wrist bands, other wearable devices, hand-held controllers, tablet computers, laptop computers, other external compute devices, etc.

As shown, neckband 2505 may be coupled to eyewear device 2502 via one or more connectors. The connectors may be wired or wireless and may include electrical and/or non-electrical (e.g., structural) components. In some cases, eyewear device 2502 and neckband 2505 may operate independently without any wired or wireless connection between them. While FIG. 25 illustrates the components of eyewear device 2502 and neckband 2505 in example locations on eyewear device 2502 and neckband 2505, the components may be located elsewhere and/or distributed differently on eyewear device 2502 and/or neckband 2505. In some embodiments, the components of eyewear device 2502 and neckband 2505 may be located on one or more additional peripheral devices paired with eyewear device 2502, neckband 2505, or some combination thereof.

Pairing external devices, such as neckband 2505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2500 may be provided by a paired device or shared between a paired device and an eyewear device, thus reducing the weight, heat profile, and form factor of the eyewear device overall while still retaining desired functionality. For example, neckband 2505 may allow components that would otherwise be included on an eyewear device to be included in neckband 2505 since users may tolerate a heavier weight load on their shoulders than they would tolerate on their heads. Neckband 2505 may also have a larger surface area over which to diffuse and disperse heat to the ambient environment. Thus, neckband 2505 may allow for greater battery and computation capacity than might otherwise have been possible on a stand-alone eyewear device. Since weight carried in neckband 2505 may be less invasive to a user than weight carried in eyewear device 2502, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 2505 may be communicatively coupled with eyewear device 2502 and/or to other devices. These other devices may provide certain functions (e.g., tracking, localizing, depth mapping, processing, storage, etc.) to augmented-reality system 2500. In the embodiment of FIG. 25, neckband 2505 may include two acoustic transducers (e.g., 2520(I) and 2520(J)) that are part of the microphone array (or potentially form their own microphone subarray). Neckband 2505 may also include a controller 2525 and a power source 2535.

Acoustic transducers 2520(I) and 2520(J) of neckband 2505 may be configured to detect sound and convert the detected sound into an electronic format (analog or digital). In the embodiment of FIG. 25, acoustic transducers 2520(I) and 2520(J) may be positioned on neckband 2505, thereby increasing the distance between the neckband acoustic transducers 2520(I) and 2520(J) and other acoustic transducers 2520 positioned on eyewear device 2502. In some cases, increasing the distance between acoustic transducers 2520 of the microphone array may improve the accuracy of beamforming performed via the microphone array. For example, if a sound is detected by acoustic transducers 2520(C) and 2520(D) and the distance between acoustic transducers 2520(C) and 2520(D) is greater than, for example, the distance between acoustic transducers 2520(D) and 2520(E), the determined source location of the detected sound may be more accurate than if the sound had been detected by acoustic transducers 2520(D) and 2520(E).

Controller 2525 of neckband 2505 may process information generated by the sensors on neckband 2505 and/or augmented-reality system 2500. For example, controller 2525 may process information from the microphone array that describes sounds detected by the microphone array. For each detected sound, controller 2525 may perform a direction-of-arrival (DOA) estimation to estimate a direction from which the detected sound arrived at the microphone array. As the microphone array detects sounds, controller 2525 may populate an audio data set with the information. In embodiments in which augmented-reality system 2500 includes an inertial measurement unit, controller 2525 may compute all inertial and spatial calculations from the IMU located on eyewear device 2502. A connector may convey information between augmented-reality system 2500 and neckband 2505 and between augmented-reality system 2500 and controller 2525. The information may be in the form of optical data, electrical data, wireless data, or any other transmittable data form. Moving the processing of information generated by augmented-reality system 2500 to neckband 2505 may reduce weight and heat in eyewear device 2502, making it more comfortable to the user.

Power source 2535 in neckband 2505 may provide power to eyewear device 2502 and/or to neckband 2505. Power source 2535 may include, without limitation, lithium ion batteries, lithium-polymer batteries, primary lithium batteries, alkaline batteries, or any other form of power storage. In some cases, power source 2535 may be a wired power source. Including power source 2535 on neckband 2505 instead of on eyewear device 2502 may help better distribute the weight and heat generated by power source 2535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 2600 in FIG. 26, that mostly or completely covers a user's field of view. Virtual-reality system 2600 may include a front rigid body 2602 and a band 2604 shaped to fit around a user's head. Virtual-reality system 2600 may also include output audio transducers 2606(A) and 2606(B). Furthermore, while not shown in FIG. 26, front rigid body 2602 may include one or more electronic elements, including one or more electronic displays, one or more inertial measurement units (IMUs), one or more tracking emitters or detectors, and/or any other suitable device or system for creating an artificial-reality experience.

Artificial reality systems may include a variety of types of visual feedback mechanisms. For example, display devices in augmented-reality system 2500 and/or virtual-reality system 2600 may include one or more liquid crystal displays (LCDs), light-emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 2500 and/or virtual-reality system 2600 may include microLED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 2500 and/or virtual-reality system 2600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory. An example controller may include one or more memory devices.

In some examples, the term processor (e.g., a "physical processor") generally refers to any type or form of hardware-implemented processing unit capable of interpreting and/or executing computer-readable instructions. In some examples, a controller may include one or more processors (e.g., physical processors), along with suitable associated circuitry such as one or more memory devices. In some examples, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, any modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed (e.g., sensor signals (e.g., capacitance data, light sensor data), voltage data, displacement data, or the like), transform the data, output a result of the transformation to perform a function (e.g., to control the device (e.g., adjust the optical power of the lens), to modify the controller (e.g., modify a look-up table used to relate sensor data to a lens parameter such as optical power), the applied voltage, actuator control parameter, or other control parameter), use the result of the transformation to perform the function, and/or store the result of the transformation to perform the function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device, comprising:
   a membrane having a membrane curvature;
   a substrate;
   an enclosure defined at least in part by the membrane and the substrate and enclosing a lens fluid;
   a peripheral structure configured to adjust the membrane curvature;
   a sensor configured to provide a sensor signal that is a function of the membrane curvature;
   a controller configured to:
   adjust the membrane curvature using a control signal;
   receive the sensor signal from the sensor; and
   modify the control signal based on the sensor signal;
   a light source, configured to provide a light beam when energized; and
   a light sensor, configured to receive light from the light beam, wherein:
   the sensor signal comprises a light sensor signal provided by the light sensor; and
   the light source is configured to direct the light beam into the enclosure.

2. The device of claim 1, wherein:
   the membrane is an elastic membrane;
   the substrate is an optically transparent substrate; and
   the device has an optical power based on the membrane curvature.

3. The device of claim 2, wherein the sensor signal is a function of the optical power of the device.

4. The device of claim 1, wherein the sensor signal is a light sensor signal or a capacitance sensor signal.

5. The device of claim 1, wherein the light sensor is configured to receive the light from a portion of the light beam that is totally internally reflected within the enclosure.

6. The device of claim 1, wherein the light sensor is configured to receive at least a portion of the light beam that is totally internally reflected from a surface of the membrane.

7. The device of claim 1, wherein:
the light beam is a divergent light beam;
a portion of the divergent light beam is totally internally reflected from a surface of the membrane;
the portion of the divergent light beam is a function of the membrane curvature; and
the light sensor is configured to receive the portion of the divergent light beam.

8. The device of claim 1, wherein the light source comprises a laser or a light-emitting diode.

9. The device of claim 1, wherein the light beam is a visible light beam or near-IR light beam.

10. The device of claim 1, wherein the light sensor comprises a photodiode or photoresistor.

11. A device, comprising:
a membrane having a membrane curvature;
a substrate;
an enclosure defined at least in part by the membrane and the substrate and enclosing a lens fluid;
a peripheral structure configured to adjust the membrane curvature;
a sensor configured to provide a sensor signal that is a function of the membrane curvature; and
a controller configured to:
adjust the membrane curvature using a control signal;
receive the sensor signal from the sensor; and
modify the control signal based on the sensor signal,
wherein the device further comprises:
a first electrode;
a second electrode; and
a capacitance sensor configured to provide a capacitance sensor signal based on a capacitance between the first electrode and the second electrode,
wherein the sensor signal is based on the capacitance sensor signal.

12. The device of claim 11, wherein the first electrode and the second electrode are generally coplanar.

13. The device of claim 11, wherein the first electrode is supported by the substrate.

14. The device of claim 13, wherein the second electrode is supported by the substrate.

15. The device of claim 13, wherein the second electrode is supported by the membrane.

16. The device of claim 11, wherein the capacitance sensor signal is a ratiometric capacitance signal based on a ratio of the capacitance between the first electrode and the second electrode to a second capacitance.

17. The device of claim 11, wherein:
the membrane comprises an electroactive material located between a pair of electrodes;
the membrane curvature is adjustable based on an electric potential applied between the pair of electrodes; and
the pair of electrodes comprises the first electrode.

\* \* \* \* \*